United States Patent
Johnson et al.

[11] Patent Number: 6,126,533
[45] Date of Patent: *Oct. 3, 2000

[54] MOLDED ABRASIVE BRUSH

[75] Inventors: David E. Johnson, Ames, Iowa; Lawrence J. Mann, Lake Elmo, Minn.; Scott M. Mevissen, White Bear Lake, Minn.; Richard M. Pihl, Cottage Grove, Minn.; David C. Roeker, Hudson, Wis.

[73] Assignee: 3M Innovative Properties Company, St. Paul, Minn.

[*] Notice: This patent is subject to a terminal disclaimer.

[21] Appl. No.: 08/953,172

[22] Filed: Oct. 17, 1997

Related U.S. Application Data

[63] Continuation of application No. 08/431,910, Apr. 28, 1995, Pat. No. 5,679,067.

[51] Int. Cl.[7] ..................................................... B24D 11/00
[52] U.S. Cl. ........................... 451/527; 451/550; 451/533; 451/359; 51/298
[58] Field of Search ..................................... 451/527, 528, 451/530, 532, 533, 536, 359, 353; 51/298; 15/230.12, 230.14, 230.15, 230.16

[56] References Cited

U.S. PATENT DOCUMENTS

| | | | |
|---|---|---|---|
| Re. 26,403 | 6/1968 | Kutik | 15/187 |
| 1,910,444 | 5/1933 | Nicholson . | |
| 2,328,998 | 9/1943 | Radford | 51/185 |
| 2,682,734 | 7/1954 | Peterson | 51/190 |
| 2,826,776 | 3/1958 | Peterson | 15/179 |
| 2,845,648 | 8/1958 | Peterson | 15/159 |
| 2,878,048 | 3/1959 | Peterson | 288/2 |
| 2,984,053 | 5/1961 | Peterson | 51/193.5 |
| 3,016,554 | 1/1962 | Peterson | 15/159 |
| 3,041,156 | 6/1962 | Rowse et al. | 51/298 |
| 3,076,219 | 2/1963 | Peterson | 15/179 |
| 3,090,061 | 5/1963 | Charvat | 15/159 |
| 3,134,122 | 5/1964 | Charvat | 15/179 |
| 3,146,560 | 9/1964 | Hurst | 51/188 |
| 3,233,272 | 2/1966 | Pambello | 15/182 |
| 3,260,582 | 7/1966 | Zimner, Jr. et al. | 51/293 |
| 3,270,467 | 9/1966 | Block et al. | 51/358 |
| 3,522,342 | 7/1970 | Nungesser et al. | 264/210 |
| 3,547,608 | 12/1970 | Kitazawa | 51/294 |
| 3,562,968 | 2/1971 | Johnson et al. | 51/389 |
| 3,618,154 | 11/1971 | Muhler et al. | 15/168 |
| 3,632,320 | 1/1972 | Henmi et al. | 51/298 |
| 3,667,170 | 6/1972 | MacKay, Jr. | 51/389 |

(List continued on next page.)

FOREIGN PATENT DOCUMENTS

| | | | |
|---|---|---|---|
| 0 282 243 | 9/1988 | European Pat. Off. | D01F 6/12 |
| 0 513 798 | 11/1992 | European Pat. Off. | B24D 13/10 |
| 2 624 773 | 6/1989 | France | B23D 61/18 |
| HEI6-21376 | 3/1994 | Japan | D01F 6/92 |
| 743 022 | 1/1956 | United Kingdom . | |
| 1327653 | 8/1973 | United Kingdom | B29F 1/00 |
| 1480096 | 7/1977 | United Kingdom | C08J 5/14 |
| 2043501 | 10/1980 | United Kingdom | B24D 11/00 |
| 2280142 | 1/1995 | United Kingdom | B29C 67/24 |
| 2281075 | 2/1995 | United Kingdom | B24D 5/06 |

OTHER PUBLICATIONS

Brochure entitled *3M Diamond Resin Turtle Disc*, 3M Abrasive Systems Division, 3 pages (undated).

(List continued on next page.)

*Primary Examiner*—Eileen P. Morgan
*Attorney, Agent, or Firm*—James J. Trussell

[57] ABSTRACT

A molded abrasive brush having a backing with a plurality of bristles extending therefrom. The backing and bristles are preferably integrally molded. The brush is molded from a moldable polymer such a thermoset polymer, thermoplastic polymer, or thermoplastic elastomer. The moldable polymer includes a plurality of organic or inorganic abrasive particles interspersed throughout at least the bristles, and can be interspersed throughout the brush. The moldable brush can include an attaching means molded integrally with the backing. Also disclosed is a method of making a molded abrasive brush and a method of refining a workpiece surface with a molded abrasive brush.

31 Claims, 6 Drawing Sheets

U.S. PATENT DOCUMENTS

| | | | |
|---|---|---|---|
| 3,696,563 | 10/1972 | Rands | 51/332 |
| 3,755,847 | 9/1973 | Leibscher | 15/179 |
| 3,947,169 | 3/1976 | Wolff et al. | 425/71 |
| 4,311,489 | 1/1982 | Kressner | 51/298 |
| 4,314,827 | 2/1982 | Leitheiser et al. | 51/298 |
| 4,507,361 | 3/1985 | Twilley et al. | 428/373 |
| 4,585,464 | 4/1986 | Haylock et al. | 51/298 |
| 4,623,364 | 11/1986 | Cottringer et al. | 51/309 |
| 4,627,950 | 12/1986 | Matsui et al. | 264/103 |
| 4,652,275 | 3/1987 | Bloecher et al. | 51/298 |
| 4,744,802 | 5/1988 | Schwabel | 51/309 |
| 4,770,671 | 9/1988 | Monroe et al. | 51/293 |
| 4,799,939 | 1/1989 | Bloecher et al. | 51/293 |
| 4,875,259 | 10/1989 | Appeldorn | 24/576 |
| 4,881,951 | 11/1989 | Wood et al. | 51/309 |
| 4,945,687 | 8/1990 | Scheider et al. | 51/394 |
| 4,964,883 | 10/1990 | Morris et al. | 51/293 |
| 4,997,461 | 3/1991 | Markhoff-Matheny et al. | 51/295 |
| 5,009,675 | 4/1991 | Kunz et al. | 51/295 |
| 5,011,508 | 4/1991 | Wald et al. | 51/293 |
| 5,025,596 | 6/1991 | Heyer et al. | 51/400 |
| 5,042,991 | 8/1991 | Kunz et al. | 51/295 |
| 5,045,091 | 9/1991 | Abrahamson et al. | 51/293 |
| 5,077,870 | 1/1992 | Melbye et al. | 24/452 |
| 5,129,197 | 7/1992 | Tyler et al. | 51/358 |
| 5,152,917 | 10/1992 | Pieper et al. | 51/295 |
| 5,170,593 | 12/1992 | Tyler et al. | 51/334 |
| 5,174,795 | 12/1992 | Wiand | 51/295 |
| 5,187,904 | 2/1993 | Tyler et al. | 51/330 |
| 5,209,760 | 5/1993 | Wiand | 51/293 |
| 5,213,591 | 5/1993 | Celikkaya et al. | 51/293 |
| 5,216,847 | 6/1993 | Scheider et al. | 51/330 |
| 5,232,470 | 8/1993 | Wiand | 51/295 |
| 5,233,719 | 8/1993 | Young et al. | 15/179 |
| 5,233,794 | 8/1993 | Kikutani et al. | 51/206 NF |
| 5,279,079 | 1/1994 | Tyler et al. | 51/358 |
| 5,304,223 | 4/1994 | Pieper et al. | 51/293 |
| 5,316,812 | 5/1994 | Stout et al. | 428/64 |
| 5,331,775 | 7/1994 | Carmichael et al. | 51/290 |
| 5,363,604 | 11/1994 | Heyer | 51/536 |
| 5,400,458 | 3/1995 | Rambosek | 15/179 |
| 5,427,595 | 6/1995 | Pihl et al. | 51/298 |
| 5,443,906 | 8/1995 | Pihl | 428/370 |
| 5,460,883 | 10/1995 | Barber, Jr. et al. | 428/370 |
| 5,525,100 | 6/1996 | Kelly et al. | 451/527 |
| 5,849,052 | 12/1998 | Barber, Jr. | 51/298 |
| 5,903,951 | 5/1999 | Ionta et al. | 15/180 |

OTHER PUBLICATIONS

Alfred E. Scheider, *Developing and Emerging Trends in Brushing and Buffing*, Technical Paper, Society of Manufacturing Engineers, SME No. MR83–682, 1983.

*Thermoplastic Elastomers: A Compreshensive Review* edited by N.R. Legge, G. Holden and H.E. Schroeder, Hanser Publishers, New York, 1987.

Joseph Gaser, *Advancements in Flexible Abrasive Finishing Tools*, Technical Paper, Society of Manufacturing Engineers, SME No. MR93–135, 1993.

Joseph P. Gaser, *Applications with Abrasive Nylon Filament Tools*, Technical Paper, Society of Manufacturing Engineers, SME No. MR93–326, 1993.

Prasad S. Mahadev and Richard C. Sawyer, Jr., *Tufted Nylon Abrasive Filament (TNAF) Disc Brushes—A New Alternative to Deburring, Edge Radiusing and Finishing Problems*, Technical Paper, Society of Manufacturing Engineers, SME No. MR93–317, 1993.

J.H. Watts, *Abrasive Monofilaments–Critical Factors that Affect Brush Tool Performance*, SME Technical Paper MR88–138, Society of Manufacturing Engineers, Dearborn, Michigan, 1988.

Technical Data Sheet entitled *Fatigue Resistance and Some of the Factors That Affect Flex Life of Brush Filling Materials*, Bulletin No. 6, E.I. Du Pont de Nemours & Co., Wilmington, Delaware, Feb. 1978.

Brochure entitled "Elast–Hone™" from EngineersEXPRESS, Medway, MA (undated).

MOLDED ABRASIVE BRUSH

This Application is a continuation of Ser. No. 08/431,910 filed Apr. 28, 1995, now U.S. Pat. No. 5,679,067.

TECHNICAL FIELD

The present invention relates generally to an abrasive brush having a plurality of bristles unitary with the backing, and more particularly to an abrasive brush made by injection molding a mixture of a moldable polymer and abrasive particles.

BACKGROUND OF THE INVENTION

Brushes have been used for many years to polish, clean and abrade a wide variety of substrates. These brush products typically have a plurality of bristles that contact the substrate. Abrasive particles can be added to bristles to increase their abrasiveness. There are many manufacturing steps necessary to manufacture a conventional abrasive brush having bristles which contain abrasive particles. A mixture of abrasive particles and a thermoplastic binder may be combined and then extruded to form a bristle. The bristle is then cut to the desired length. A plurality of these bristles are then mechanically combined to form a brush segment. Next, a plurality of these brush segments may be installed on a hub or plate to form a brush.

One example of such a brush is disclosed in U.S. Pat. No. 5,045,091, "Method of Making Rotary Brush With Removable Brush Elements," (Abrahamson et al.). In Abrahamson et al., a plurality of abrasive bristles are mechanically clamped together and a root system is installed to form a brush segment. A plurality of these brush segments are installed on a rotary hub. Another arrangement for mechanically mounting bristles on a hub to form a brush segment is disclosed in U.S. Pat. No. 5,233,719, "Apparatus and Brush Segment Arrangement for Finishing Wheel Brushes," (Young et al.). Young et al. teach a brush segment comprising a substrate with a carpet of bristles mounted on one side of the substrate, by means of a polymeric resin for example, and a root system extending from the opposite side of the substrate for engagement with a rotary hub. U.S. Pat. No. 5,400,458 (Rambosek) teaches a brush segment having a plurality of bristles embedded in a polymeric base portion. A root means for attaching the segment to a hub can be integrally molded with the base.

U.S. Pat. No. 5,233,794, "Rotary Tool Made of Inorganic Fiber-Reinforced Plastic," (Kikutani et al.), discloses a rotary tool 5 having a rotating tip formed integrally with a shaft 3. The rotary tool is formed of a thermosetting resin containing inorganic long fibers with a high degree of hardness as an abrasive means in an amount from 50% to 81% by volume. The long inorganic fibers can have a diameter in the range of 3 $\mu$m to 30 $\mu$m. In one of the embodiments of Kikutani et al., the rotating tip is formed as a column or cylinder with elements 6 which correspond to the bristle of a brush extending from the tip, as is reproduced in FIG. 10.

U.S. Pat. Nos. 5,152,917 and 5,304,223 (Pieper et al.) teach coated abrasive articles comprising precisely shaped abrasive composites bonded to a backing. The abrasive composites comprise binder and abrasive particles. The precisely shaped composites can be in the form of, for example, pyramids, sawtooth grooves, or linear grooves. The maximum distance between corresponding points on adjacent composite shapes can be less than one millimeter. The coated abrasive of Pieper et al. can be made, for example, according to the following general procedure. First, a slurry containing abrasive grains and binder is introduced to a production tool. Second, a backing is introduced to the outer surface of the production tool such that the slurry wets the front side of the backing. Third, the binder is at least partially cured. Fourth, the production tool is removed from the backing.

U.S. Pat. No. 5,316,812 (Stout et al.) teaches a thermoplastic backing for use in abrasive articles. A resinous binder adheres abrasive particles to the thermoplastic backing.

U.S. Pat. Nos. 5,174,795 and 5,232,470 (Wiand) teach a planar abrasive article comprising a sheet portion with a plurality of protrusions extending therefrom. Abrasive particles are homogeneously dispersed throughout the moldable material comprising the article. Wiand teaches one embodiment having short protrusions extending 1.6 mm (0.063 in) from the backing and having a 3.2 mm (0.125 in) diameter, and another embodiment having short protrusions extending 1.3–1.5 mm (0.05–0.06 in) from the backing and having a 1.3 mm (0.05 in) diameter.

G.B. Patent Application No. 2.043,501, (Dawkins) discloses an abrasive article for polishing ophthalmic workpieces. The abrasive article is made by injection molding a mixture of abrasive grains and a thermoplastic binder to form an abrasive article comprising a flexible backing having a plurality of upstanding projections, the ends of which act as operative abrading surfaces.

Co-pending U.S. patent application Ser. No. 08/351,884 (Pihl), issued as U.S. Pat. No. 5,443,906, discloses an extruded abrasive filament including a first elongate filament component having a continuous surface throughout its length and including a first hardened organic polymeric and a second elongate filament component coterminous with the first elongate filament component, including a second hardened organic polymeric material in melt fusion adherent contact with the first elongate filament component along the continuous surface. The second hardened organic polymeric material can be the same or different than the first hardened organic polymeric material. At least one of the first and second hardened organic polymeric materials includes a thermoplastic elastomer having abrasive particles adhered therein. Also disclosed is an abrasive article comprised of at least one abrasive filament mounted to a substrate such as a hub adapted to be rotated at a high rate of revolution.

Co-pending U.S. patent application Ser. No 08/066,862 (Barber), issued as U.S. Pat. No. 5,460,883, discloses a composite abrasive filament which includes at least one preformed core at least partially coated with a thermoplastic elastomer having abrasive particles dispersed and adhered therein, the thermoplastic elastomer and abrasive particles together comprising a hardened composition. The composite abrasive filament has a hardened composition over at least a portion, preferably over the entire surface of at least one preformed core. The preformed core is formed in a step separate from and prior to one or more coating steps, one of which coats the preformed core with abrasive-filled thermoplastic elastomer.

It is seen that there is a need to provide an abrasive brush that is easily and inexpensively manufactured, and which provides suitable durability and abrading characteristics.

SUMMARY OF THE INVENTION

One aspect of the present invention presents an integrally molded abrasive brush comprising a generally planar flexible base having a first side and a second side, and a plurality of bristles extending from the first side of the base. The bristles have an aspect ratio of at least 2 and are integrally molded with the base. The molded abrasive brush comprises a moldable polymeric material which includes abrasive particles interspersed throughout at least the bristles. In another embodiment, the bristles have an aspect ratio of at least 5 and in yet another embodiment, the bristles have an aspect ratio of at least 7.

In another aspect of the present invention, the molded abrasive brush is made of a thermoplastic elastomer. The thermoplastic elastomer can comprise a polyester based thermoplastic elastomer. The thermoplastic elastomer can include a lubricant mixed therewith. In one embodiment, the molded abrasive brush comprises a thermoplastic elastomer with abrasive particles interspersed throughout the abrasive brush. The abrasive particles can comprise inorganic abrasive particles or organic abrasive particles.

In yet another aspect of the present invention, the bristles of the molded abrasive brush are tapered so as to be wider at the root adjacent the base than at the tip. In one version, the bristles are tapered throughout their length, in another version the bristles are tapered at a first portion adjacent the root and have a constant thickness at a second portion adjacent the tip.

In a further aspect of the present invention, the molded abrasive brush includes an attachment means provided on said base for attaching said abrasive brush to a tool. The attachment means can comprise a threaded stud integrally molded with the base extending from the second side of the base.

In yet a further aspect of the present invention, the base of the molded abrasive brush includes a reinforcing means. In one version, the reinforcing means comprises a reinforcing substrate provided on the second side of the base.

In another aspect of the present invention, an integrally molded abrasive brush is presented, comprising a base having a first side and a second side, and a plurality of bristles extending the first side of said base and integrally molded with the base. The molded abrasive brush comprises a thermoplastic elastomer including abrasive particles interspersed throughout at least the plurality of bristles. In another aspect, the thermoplastic elastomer is selected from: polyester-based thermoplastic elastomer, nylon-based thermoplastic elastomer, and polyurethane-based thermoplastic elastomer.

In a further aspect of the present invention, an integrally molded abrasive brush is presented, comprising a base having a first side and a second side, a plurality of flexible bristles extending from the first side of the base integrally molded with the base, and a threaded stud integrally molded with the base and extending from the second side of the base for attaching said abrasive brush to a tool to rotate the abrasive brush. The molded abrasive brush comprises a moldable polymeric material which includes abrasive particles interspersed throughout at least the plurality of bristles.

In yet a further aspect of the present invention, an integrally molded abrasive brush is presented comprising a base having a first side and a second side, and a plurality of bristles extending from the first side of said base integrally molded with said base. The molded abrasive brush comprises a moldable polymeric material which includes organic abrasive particles interspersed throughout at least the bristles. In another aspect, the polymeric material comprises organic abrasive particles interspersed throughout the abrasive brush.

The present invention also includes a method of making a molded abrasive brush. The method comprises the steps of: a) mixing a moldable polymer and abrasive particles together to form a mixture; b) heating the mixture to form a flowable material; and c) injecting the flowable material under pressure into a mold to form an abrasive brush, wherein the brush comprises: a generally planar flexible base having a first side and a second side, and a plurality of bristles extending from the first side of the base, wherein the bristles have an aspect ratio of at least 2 and are integrally molded with the base. In another aspect of the inventive method, step a) comprises mixing a thermoplastic elastomer with abrasive particles. In a further aspect of the inventive method, step a) further comprises mixing a lubricant with the mixture.

Also presented is a method of refining a workpiece surface, comprising: a) providing an integrally molded abrasive brush comprising: a base having a first side and a second side, and a plurality of bristles extending from the first side of the base, wherein the bristles are integrally molded with the base; and wherein the molded abrasive brush comprises a thermoplastic elastomer including abrasive particles interspersed throughout at least the plurality of bristles; b) contacting the bristles against the workpiece surface; and c) moving the abrasive brush relative to the workpiece to thereby refine the workpiece surface. In another aspect of the inventive method, step c) comprises removing workpiece material from the workpiece surface, and the abrasive particles comprise inorganic abrasive particles. In a further aspect of the inventive method, the workpiece surface includes a foreign material thereon, the abrasive particles comprise organic abrasive particles, and step c) comprises removing foreign material from the workpiece surface.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

This invention pertains to a molded abrasive brush, a method of making a molded abrasive brush and a method of using a molded abrasive brush.

Figure 1:
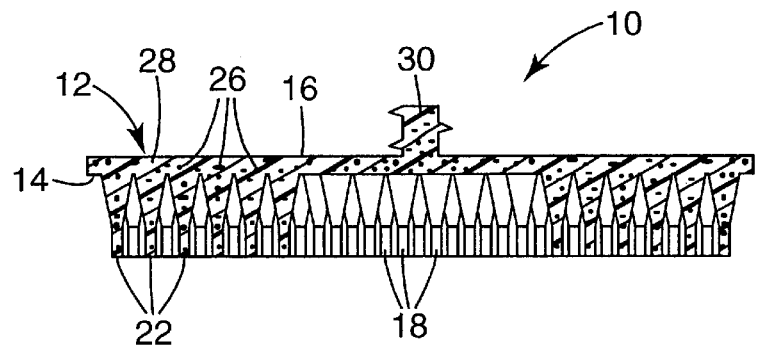
FIG. 1 is across sectional view of a first embodiment of an abrasive brush made in accordance with the present invention.
Figure 1A:
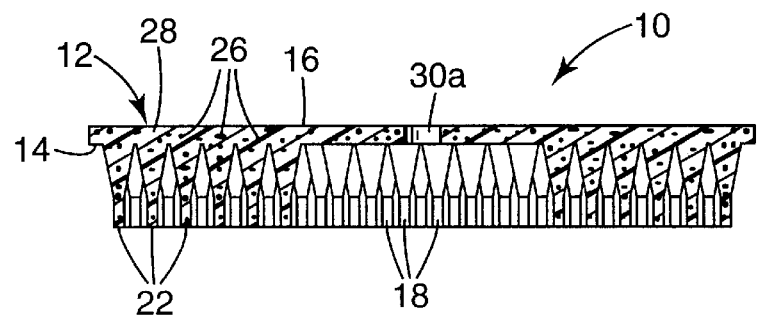
Figure 2:
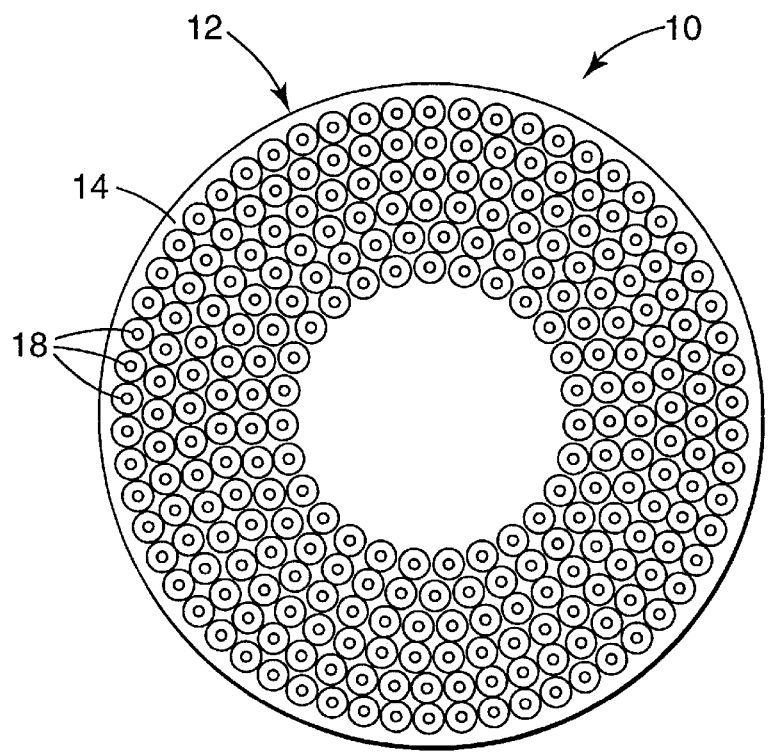
FIG. 2 is a plan view of the abrasive brush of FIG. 1.

Referring to FIGS. 1 and 2, abrasive brush 10 comprises a planar base 12 having first side 14 and second side 16. A plurality of bristles 18 project outwardly from first side 14 of base 12. In between bristles 18 there are spaces in which the first side 14 of the base 12 is exposed. Abrasive brush 10 is preferably integrally molded and comprises a generally homogenous composition of abrasive particles 26 in a moldable polymer 28.

The materials, manufacturing process and abrasive brush configuration will depend upon the desired refining application. As used herein, the term "refine" includes at least one of the following: remove a portion of a workpiece surface; impart a surface finish to a workpiece; clean a workpiece surface, including removing paint or other coatings, gasket material, corrosion, or other foreign material; or some combination of the foregoing. In some applications, it may be preferred to provide aggressive abrasive characteristics, in which case the abrasive brush may comprise larger size abrasive particles, harder abrasive particles, a higher abrasive particle to binder ratio, or some combination of the above. In other applications, it may be preferred to provide a polish type finish to the surface being refined, or to clean a surface without removing surface material itself, in which case the abrasive brush may employ smaller abrasive particles, softer abrasive particles, lower particle to binder ratio, or some combination of the above. It is possible to employ abrasive particles 26 of varied composition and hardness to obtain the desired abrading characteristics.

Base

In a preferred embodiment, the base 12 is generally planar. However, it is within the scope of the invention to have a contoured or curved base. For example, base 12 may be convex, concave, or conical in shape. In such an arrangement, the bristles 18 may be of uniform length in which case tips 22 of the bristles will not be coplanar, or bristles may be of varying length in which case the tips may be coplanar. The base 12 may optionally contain a lip around its periphery where a portion of the base extends radially beyond the outermost bristles 18. The size of the lip is preferably minimized so that it does not interfere with maneuvering the abrasive brush 10 against surfaces bounding and at an angle relative to the surface of the workpiece.

In one preferred embodiment, the base 12 is of a suitable material and thickness to provide a flexible base 12, which helps maintain more bristles in contact with an uneven or irregular workpiece. The base 12 preferably is capable of flexing at least 10°, more preferably at least 20°, and still more preferably at least 45° without damage or substantial permanent deformation to the base. The desired degree of flexing also depends upon the intended refining application and the material of the workpiece. The ability to refine an uneven or irregular workpiece is enhanced when the flexible base 12 is combined with flexible bristles 18. The base 12 can preferably have a thickness of from about 1.0 to 15.0 mm, more preferably from about 1.5 to 10 mm, still more preferably from about 2.0 to 6 mm, and most preferably from about 2.5 to 4.0 mm. Base 12 is preferably circular as illustrated in FIG. 2. The diameter of base 12 is preferably from about 2.5 to 20.0 cm (1.0 to 8.0 in), although smaller and larger bases are also contemplated. Base shapes other than circular are contemplated, including, but not limited to, oval, rectangular, square, triangular, diamond, and other polygonal shapes, as are relatively rigid or inflexible bases.

Preferably, the base 12 is molded integral with the bristles 18 to provide a unitary abrasive brush. Thus, no adhesive or mechanical means is required to adhere the bristles 18 to the base 12. It is preferred that the base 12 and bristles 18 are molded simultaneously. In some instances, there may be a single mixture of abrasive particles 26 and moldable polymer 28 that is placed in the mold in a single injection process. In such an embodiment, the abrasive brush 10 comprises a generally homogenous composition throughout. However, due to the molding process, the abrasive particle/binder mix may not be perfectly homogeneous. For example, as the polymer and abrasive mix is injected into the mold, the effects of the narrow bristle cavities may be to cause more polymer to initially cool adjacent the inside of the bristle cavity near the base, forcing a mix having a somewhat higher concentration of abrasive particles toward the tip 22 of the bristle.

Alternatively, there may be two or more insertions of a moldable polymer 28 to the mold. For example, one insertion may contain a mixture of moldable polymer 28 and abrasive particles 26. This mixture is primarily located in the bristles 18. A second insertion may contain moldable polymer 28 without abrasive particles 26, or with fewer abrasive particles. The moldable polymer 28 without abrasive particles would be present primarily in the base 12 of the abrasive brush 10.

It is also within the scope of this invention to have two insertions, both containing abrasive particles. The first insertion may have larger abrasive particles, while the second insertion may have smaller and/or softer abrasive particles. During abrading, the coarse abrasive particles are used and then the finer abrasive particles are used.

Bristles

The bristles 18 extend from the first side 14 of base 12, with root 20 adjacent the base 12 and tip 22 remote from the base 12. The bristles 18 may have any cross sectional area, including but not limited to, circular, star, half moon, quarter moon, oval, rectangular, square, triangular, diamond or polygonal. In one preferred embodiment, the bristles 18 comprise a constant circular cross section along the length of the bristle 18. In other preferred embodiments, the bristles 18 will have a non-constant or variable cross section along all or a portion of the length of the bristle.

Figure 3:
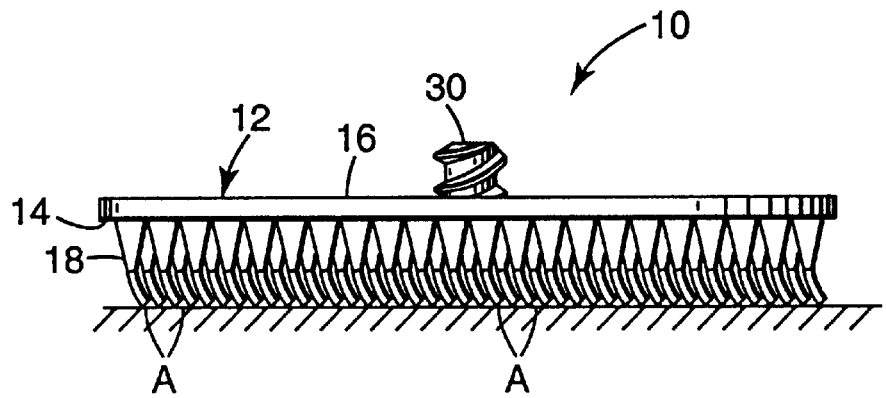
FIG. 3 in elevational view of the abrasive brush of FIG. 1 in operation.
Figure 4:
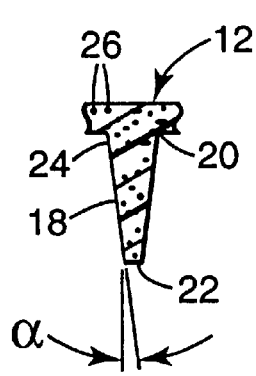
FIG. 4 is a cross sectional view of one embodiment of the bristle portion of the present invention.
Figure 5:
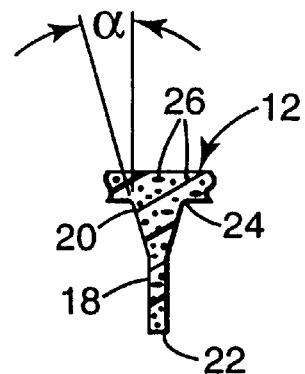
FIG. 5 is a cross sectional view of a further embodiment of the bristle portion of the present invention.

It is preferred to have tapered bristles such that the cross sectional area of the bristle decreases in the direction away from base 12. Tapered bristles 18 can have any cross section as described above, and preferably have a circular cross section. Tapered bristles 18 tend to be easier to remove from the mold during fabrication of the abrasive brush than constant cross sectional area bristles 18. Furthermore, bristles 18 are subjected to bending stresses as abrasive brush 10 is rotated against a workpiece as illustrated in FIG. 3. These bending stresses are highest at the root 20 of bristles 18. Therefore, a tapered bristle such as illustrated in FIGS. 4 and 5 is more able to resist bending stresses than a cylindrical bristle 18. Furthermore, brush 10 preferably includes a fillet radius 24 at the transition between the root 20 of the bristle 18 and the first surface 14 of the base. Fillet 24 can have a radius of from about 0.25 to 2.5 mm (0.010 to 0.100 in), and more preferably from about 0.5 to 1.3 mm (0.020 to 0.050 in). In one preferred embodiment illustrated in FIG. 4, bristles 18 are conical, having a decreasing diameter along the entire length. In another preferred embodiment illustrated in FIG. 5, bristles 18 have a tapered portion adjacent the base and a cylindrical portion for the remainder of the bristle. In one preferred embodiment, the taper extends from root 20 to approximately 80% of the length towards the tip 22, and the bristle is cylindrical for the remainder of the length to tip 22. The taper can comprise any suitable angle, and in one preferred embodiment is approximately 3° as measured at angle α in FIGS. 4 and 5.

Bristles 18 comprise an aspect ratio defined as the length of bristle 18 measured from root 20 to tip 22, divided by the width of the bristle. In the case of a tapered bristle, the width is defined as the average width along the length for purposes of determining the aspect ratio. In the case of non-circular cross section, the width is taken as the longest width in a given plane, such as the corner-to-corner diagonal of a square cross section. The aspect ratio of bristles 18 is preferably at least 1, more preferably from about 4 to 18, and still more preferably from about 6 to 16. The size of bristles 18 can be selected for the particular application of brush 10. The length of the bristles 18 is preferably from about 5 to 80 mm, more preferably from about 5 to 50 mm, still more preferably from about 5 to 25 mm, and most preferably from about 10 to 20 mm. The width of the bristles 18 is preferably from about 0.25 to 10 mm, more preferably from about 0.5 to 5.0 mm, still more preferably about 0.75 to 3.0 mm, and most preferably from about 1.0 to 2.0 mm. In one preferred embodiment, all of the bristles 18 have the same dimensions. Alternatively, bristles 18 on a single brush 10 may have different dimensions such as different lengths, widths or cross sectional areas. The lengths of the bristles 18 and contour of the base 12 are preferably chosen so that the tips 22 are generally coplanar, although other arrangements are also contemplated by the present invention.

The density and arrangement of the bristles 18 can be chosen for the particular application of abrasive brush 10. The bristles 18 may be arranged on the base 12 in a random or ordered pattern. If the base 12 is circular, it is preferred to have the bristles 18 arranged in concentric circular rings. As abrasive brush 10 is rotated to treat a workpiece, those bristles near the center of the base 12 travel at a slower linear speed than the bristles 18 near the periphery of the base 12. Therefore, bristles 18 at or near the center of the base 12 would do less work relative to the bristles 18 remote from the center. Accordingly, brush 10 may have a portion of first face 14 at the center of base 12 which does not include any bristles 18 as illustrated in FIG. 2. The bristles 18 may or may not abut adjacent bristles as desired. The density of bristles 18 preferably ranges from about 5 to 30 bristles/cm$^2$, more preferably from about 10 to 25 bristles/cm$^2$, still more preferably from about 15 to 20 bristles/cm$^2$ and most preferably about 20 bristles/cm$^2$. The bristles may be present over only a portion of first side 14 of base 12, or substantially the entire first side 14 of base 12.

The material, length, and configuration of the bristles are preferably chosen such that bristles 18 are sufficiently flexible to aid in refining uneven or irregular workpieces. The bristles 18 are preferably capable of bending at least 10°, more preferably at least 25°, still more preferably at least 45°, and most preferably at least 90°, without damage or substantial permanent deformation to the bristles. Preferably, base 12 is also flexible to further aid in refining such workpieces. When flexible bristles are used, the bristle contacts the workpiece surface at the juncture of the leading edge of the tip 22 and the outermost portion of the side surface of the bristle, as illustrated at A in FIG. 3. This is in contrast to inflexible abrading protrusions having very low aspect ratios, as known in the art. Such protrusions primarily contact the workpiece with the entire planar surface at the tip of the protrusion.

In one preferred embodiment, bristles 18 are of equal length and extend from a planar base 12, resulting in the tips 22 being coplanar when the brush is at rest. It is also possible to have base 12 and bristle 18 arrangements in which the tips 22 of the bristles are not coplanar. For example, it is possible to have bristles near the periphery of the base be longer than the bristles at the center of the brush 10. This can be done to compensate for the deformation of the bristles caused by high rotational speed (as high as 22,000 RPM or more). Under such conditions, the bristles near the periphery of the base 12 travel at a higher speed than the bristles near the center of the base, and thus bend radially outwardly to a greater extent than the bristles near the center of the base. The at-rest height variation can be selected so as to achieve approximately coplanar bristle tips 22 at operating conditions.

Attachment Means

Referring to FIG. 1, abrasive brush 10 comprises attachment means 30 integral with base 12. The attachment means 30 provides a means to secure the abrasive brush 10 to a rotary tool and/or a support pad or a back up pad during use. It is preferred that the attachment means 30 is molded integrally with the base and bristles. Preferred attachment means are described in U.S. Pat. Nos. 3,562,968; 3,667,170; and 3,270,467 the entire disclosures of all of which are incorporated herein by reference. Most preferred is the integrally-molded threaded stud adapted for screw-type engagement with a rotary tool as taught by U.S. Pat. No. 3,562,968. This type of attachment means is preferred for circular or disc shaped brush 10. It is preferred that the attachment means 30 be centered relative to the base 12 for proper rotation. The attachment means 30 may be made from the same material as the rest of the abrasive brush 10, and may contain abrasive particles 26. Alternatively, the attachment means 30 may be made from a separate injection of moldable polymer 28 without abrasive particles 26.

It is also within the scope of this invention to use a hook and loop type attachment such as that taught in U.S. Pat. No. 5,077,870, "Mushroom-Type Hook Strip for a Mechanical Fastener, " (Melbye et al.) or of the type commercially available as SCOTCHMATE™ from Minnesota Mining and Manufacturing Company, St. Paul, Minn. It is also possible to use a hermaphroditic fastener such as DUAL LOCK™ fastener, available from Minnesota Mining and Manufacturing Company, to secure the abrasive brush to a back up pad. It is also possible to employ intermeshing structured surfaces such as taught in U.S. Pat. No. 4,875,529, "Intermeshing Articles" (Appeldorn), the entire disclosure of which is incorporated herein by reference. Alternatively, the base of the abrasive brush may contain one or more straight or threaded holes or openings so that the abrasive brush may be mechanically secured (such as with a bolt and nut) to the back up pad.

Reinforcing Means

Figure 6:
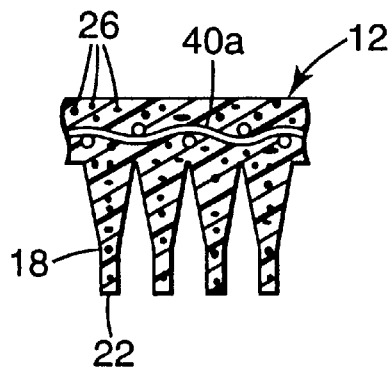
FIG. 6 is a partial cross sectional view of an alternate embodiment of an abrasive brush including a reinforcing means according to the present invention.

The base portion may further comprise reinforcing means which can comprise a fiber reinforcing means 40a as illustrated in FIG. 6. Reinforcing means 40a can comprise, for example, fabric, non-woven sheeting, mesh, scrim, and the like, or can comprise individual fibers compounded into the moldable polymer and dispersed throughout the abrasive brush. The purpose of the reinforcing means is to increase the flexural strength and tensile strength of the backing. Examples of reinforcing fibers suitable for use in the present invention include glass fibers, metal fibers, carbon fibers, wire mesh, mineral fibers, fibers formed of heat resistant organic materials, or fibers made from ceramic materials. Other organic fibers include polyvinyl alcohol fibers, nylon fibers, polyester fibers and phenolic fibers. Glass fibers may preferably contain a coupling agent, such as a silane coupling agent, to improve the adhesion to the thermoplastic material. The length of the fiber will range from about 0.5 mm to about 50 mm, preferably about 1 mm to about 25 mm, most preferably about 1.5 mm to about 10 mm. The fiber denier will be between about 25 to 300, preferably between 50 to 200.

Figure 7:
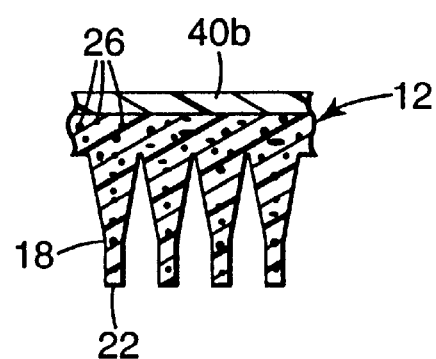
FIG. 7 is a view like FIG. 6 of an alternate reinforcing means according to the present invention.

The reinforcing means may comprise a reinforcing layer or substrate 40b as illustrated in FIG. 7. Abrasive brush 10 comprises base 12 having attached to it on second side 16 a reinforcing substrate 40b. The purpose of the reinforcing substrate 40b is to increase the strength of the base 12. The reinforcing substrate 40b can be free of abrasive particles 26. It is not necessary to include abrasive particles in this layer, since the reinforcing substrate 40b does not contact the workpiece. The reinforcing substrate can comprise a moldable polymer. In this case, the reinforcing substrate can be molded at the same time as the abrasive brush 10. Alternatively, the reinforcing substrate 40b can be a backing type material such as a polymeric film, primed polymeric film, cloth, paper, vulcanized fiber, nonwoven layer, and treated versions thereof. In this case, the reinforcing substrate 40b can be inserted into the mold and the moldable polymer 28 forming the brush 10 can bond to the reinforcing substrate 40b. Alternatively, the reinforcing substrate 40b can be adhesively bonded to the brush 10 after the brush is molded. In one preferred embodiment, the reinforcing substrate 40b is coextensive with the base 12, although it may be smaller or larger as desired.

Moldable Polymer

The moldable polymer material 28 is preferably an organic binder material that is capable of being molded, i.e., it is capable of deforming under heat to form a desired shape. The moldable polymer may be a thermoplastic polymer, a thermosetting polymer, or a thermoplastic elastomer. In the case of a thermoplastic polymer, the organic binder is heated above its melting point which causes the polymer to flow. This results in the thermoplastic polymer flowing into the cavities of the mold to form the abrasive brush 10. The abrasive brush is then cooled to solidify the thermoplastic binder. In the case of a thermosetting polymer, during molding the organic binder is in a thermoplastic state, i.e., after it is heated above its melting point it will flow into the cavities of the mold to form the abrasive brush. Next, the abrasive brush is further heated, in some instances at a higher temperature, to cause this organic binder to crosslink and form a thermosetting polymer. Examples of suitable thermosetting polymers include styrene butadiene rubber, polyurethane, urea-formaldehyde, epoxy, and phenolics.

Thermoplastic Polymers

The abrasive brush according to the present invention may comprise a thermoplastic polymer. Examples of suitable thermoplastic polymers include polycarbonate, polyetherimide, polyester, polyethylene, polysulfone, polystyrene, polybutylene, acrylonitrile-butadiene-styrene block copolymer, polypropylene, acetal polymers, polyurethanes, polyamides, and combinations thereof In general, preferred thermoplastic polymers of the invention are those having a high melting temperature and good heat resistance properties. Thermoplastic polymers may be preferably employed for low speed applications of abrasive brush 10, in which stress during operation is relatively low.

Examples of commercially available thermoplastic polymers suitable for use with the present invention include Grilon™ CR9 copolymer of Nylon 6,12 available from EMS-American Grilon, Inc., Sumter S.C.; Profax™ and KS075 polypropylene based thermoplastic available from Himont USA, Inc., Wilmington, Del.; and Duraflex™ polybutylene based thermoplastic available from Shell Chemical Co., Houston, Tex.

Thermoplastic Elastomers

In some instances, such as high speed, high stress applications, it is preferred that the moldable polymer is a thermoplastic elastomer or includes a thermoplastic elastomer. Thermoplastic elastomers (or "TPE"s) are defined and reviewed in *Thermoplastic Elastomers, A Comprehensive Review*, edited by N. R. Legge, G. Holden and H. E. Schroeder, Hanser Publishers, New York, 1987 (referred to herein as "Legge et al.", the entire disclosure of which is incorporated by reference herein). Thermoplastic elastomers (as used herein) are generally the reaction product of a low equivalent weight polyfunctional monomer and a high equivalent weight polyfunctional monomer, wherein the low equivalent weight polyfunctional monomer has a functionality of at most about 2 and equivalent weight of at most about 300 and is capable on polymerization of forming a hard segment (and, in conjunction with other hard segments, crystalline hard regions or domains) and the high equivalent weight polyfunctional monomer has a functionality of at least about 2 and an equivalent weight of at least about 350 and is capable on polymerization of producing soft, flexible chains connecting the hard regions or domains.

"Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Thermoplastic elastomers combine the processability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer. Segmented thermoplastic elastomers are preferably the condensation reaction product of a high equivalent weight polyfunctional monomer having an average functionality of at least 2 and an equivalent weight of at least about 350, and a low equivalent weight polyfunctional monomer having an average functionality of at least about 2 and an equivalent weight of less than about 300. The high equivalent weight polyfunctional monomer is capable on polymerization of forming a soft segment, and the low equivalent weight polyfunctional monomer is capable on polymerization of forming a hard segment. Segmented thermoplastic elastomers useful in the present invention include polyester TPEs, polyurethane TPEs, and polyamide TPEs, and silicone elastomer/polyimide block copolymeric TPEs, with the low and high equivalent weight polyfunctional monomers selected appropriately to produce the respective TPE.

The segmented TPEs preferably include "chain extenders", low molecular weight (typically having an equivalent weight less than 300) compounds having from about 2 to 8 active hydrogen functionality, and which are known in the TPE art. Particularly preferred examples include ethylene diamine and 1,4-butanediol.

"Ionomeric thermoplastic elastomers" refers to a subclass of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts. A review of ionomer history and patents concerning same is provided in Legge et al., pp. 231–243.

"Thermoplastic polymer", or "TP" as used herein, has a more limiting definition than the general definition, which is "a material which softens and flows upon application of pressure and heat." It will of course be realized that TPEs meet the general definition of TP, since TPEs will also flow upon application of pressure and heat. It is thus necessary to be more specific in the definition of "thermoplastic" for the purposes of this invention. "Thermoplastic", as used herein, means a material which flows upon application of pressure and heat, but which does not possess the elastic properties of an elastomer when below its melting temperature.

Blends of TPE and TP materials are also within the invention, allowing even greater flexibility in tailoring mechanical properties of the abrasive filaments of the invention.

Commercially available and preferred segmented polyesters include those known under the trade designations "Hytrel™ 4056", "Hytrel™ 5526", "Hytrel™ 5556", "Hytrel™ 6356", "Hytrel™ 7246", and "Hytrel™ 8238" available from E.I. Du Pont de Nemours and Company, Inc., Wilmington, Del., with the most preferred including Hytrel™ 5526, Hytrel™ 5556, and Hytrel™ 6356. A similar family of thermoplastic polyesters is available under the tradename "Riteflex" (Hoechst Celanese Corporation). Still further useful polyester TPEs are those known under the trade designations "Ecdel", from Eastman Chemical Products, Inc., Kingsport, Tenn.; "Lomad", from General Electric Company, Pittsfield, Mass.; "Arnitel" from DSM Engineered Plastics; and "Bexloy" from Du Pont. Further useful polyester TPEs include those available as "Lubricomp" from LNP Engineering Plastics, Exton, Pa., and is commercially available incorporating lubricant, glass fiber reinforcement, and carbon fiber reinforcement.

Commercially available and preferred segmented polyamides include those known under the trade designation "Pebax" and "Rilsan", both available from Atochem Inc., Glen Rock, N.J.

Commercially available and preferred segmented polyurethanes include those known under the trade designation "Estane", available from B.F. Goodrich, Cleveland, Ohio. Other segmented preferred segmented polyurethanes include those known under the trade designations "Pellethane", and "Isoplast" from The Dow Corning Company, Midland, Mich., and those known under the trade designation "Morthane", from Morton Chemical Division, Morton Thiokol, Inc.; and those known under the trade designation "Elastollan", from BASF Corporation, Wyandotte, Mich.

Thermoplastic elastomers are further described in U.S. patent application Ser. No. 08/351,884, filed Dec. 6, 1994, and assigned to the assignee of the present application, the entire disclosure of which is incorporated herein by reference.

Abrasive Particles

The abrasive particles 26 typically have a particle size ranging from about 0.1 to 1500 micrometers, usually between about 1 to 1300 micrometers, and preferably between 50 and 500 micrometers. The abrasive particles may be organic or inorganic. Examples of abrasive particles include fused aluminum oxide, ceramic aluminum oxide, heated treated aluminum oxide, silicon carbide, titanium dibromide, alumina zirconia, diamond, boron carbide, ceria, cubic boron nitride, and garnet. Still other examples of abrasive particles include solid glass spheres, hollow glass spheres, calcium carbonate, polymeric bubbles, silicates, aluminum trihydrate, and mullite. Preferred ceramic aluminum oxide abrasive particles include those described in U.S. Pat. Nos. 4,314,827; 4,623,364; 4,744,802; 4,770,671; 4,881,951; and 4,964,883, the contents of all of which are incorporated herein by reference. The abrasive particle can be any particulate material (inorganic or organic) that when combined with the binder results in an abrasive brush 10 that can refine a workpiece surface. The selection of the abrasive material will depend in part on the intended application. For example, for stripping paints from a vehicle, it is sometimes preferred to use a relatively soft abrasive particle so as not to damage the surface underneath the paint. Alternatively, for removing burs from metal workpieces, it is preferred to use a harder abrasive particle such as alumina. The abrasive brush of the present invention may include two or more types and/or sizes of abrasive particles.

As used herein, the term abrasive particles also encompasses single abrasive particles which are bonded together to form an abrasive agglomerate. Abrasive agglomerates are further described in U.S. Pat. Nos. 4,311,489; 4,652,275; and 4,799,939, the disclosures of all of which are incorporated herein by reference. The abrasive particles of this invention may also contain a surface coating. Surface coatings are known to improve the adhesion between the abrasive particle and the binder in the abrasive article. Such surface coatings are described in U.S. Pat. Nos. 5,011,508; 1,910,444; 3,041,156; 5,009,675; 4,997,461; 5,213,591; and 5,042,991, the disclosures of all of which are incorporated herein by reference. In some instances, the addition of the coating improves the abrading and/or processing characteristics of the abrasive particle.

Organic abrasive particles suitable for use with the abrasive brush of the present invention include polyester, polyvinylchloride, methacrylate, methylmethacrylate, polycarbonate, polystyrene and thermoset polymeric particles such as phenolic particles and urea-formaldehyde particles. A preferred organic abrasive particle is a metal and mold cleaning plastic blast media available commercially as "MC" blast media from Maxi Blast Inc., South Bend, Ind., available with an antistatic coating, but preferably untreated. The "MC" media is a 99% melamine formaldehyde cellulosate, an amino thermoset plastic.

The abrasive particles 26 are preferably from about 5 to 60 percent by weight of the particle and polymer mixture, and more preferably about 30 to 40 percent, although more or less may be used as desired.

Additives

The moldable polymeric material 28 may further include optional additives, such as, for example, fillers (including grinding aids), fibers, antistatic agents, antioxidants, processing aids, UV stabilizers, flame retardants, lubricants, wetting agents, surfactants, pigments, dyes, coupling agents, plasticizers and suspending agents. The amounts of these materials are selected to provide the properties desired.

Lubricants

For some refining applications, it is preferred that the molded polymer 28 include a lubricant. The presence of a lubricant in the moldable polymer 28 reduces the friction of the bristle contacting the workpiece surface. This reduces the heat generated when refining the workpiece. Excessive heat may cause the abrasive brush to leave residue on the workpiece or to otherwise harm the workpiece. Suitable lubricants include lithium stearate, zinc stearate, calcium stearate, aluminum stearate, ethylene bis stearamide, graphite, molybdenum disulfide, polytetraflouroethylene (PTFE), and silicone compounds, for example useful with thermoplastics and thermoplastic elastomers.

An example of a preferred silicone material, which is described in U.S. patent application Ser. No. 08/430,477; entitled "Abrasive Article Having a Bond System Comprising a Polysiloxane" (Barber), (attorney docket number 51579USA8A) filed on even date herewith, the description of the silicone material being incorporated herein by reference, is a high molecular weight polysiloxane of formula (A):

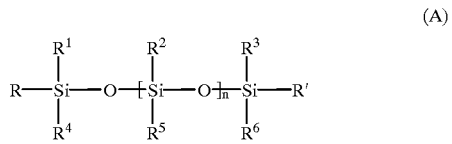

(A)

wherein R, R', $R^1$, $R^2$, $R^3$, $R^4$, $R^5$, and $R^6$ may be the same or different and can be an alkyl, vinyl, chloroalkyl, aminoalkyl, epoxy, fluororalkyl, chloro, fluoro, or hydroxy, and n is 500 or greater, preferably 1,000 or greater, more preferably 1,000 to 20,000, and most preferably 1,000 to 15,000.

Another preferred polysiloxane is a polydimethylsiloxane of formula (B):

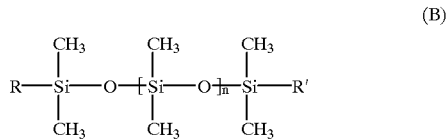

(B)

wherein R and R' may be the same or different and can be an alkyl, vinyl, chloroalkyl, aminoalkyl, epoxy, fluororalkyl, chloro, fluoro, or hydroxy, and n is 500 or greater, preferably 1,000 or greater, more preferably 1,000 to 20,000, and most preferably 1,000 to 15,000.

Polysiloxanes are available in many different forms, e.g., as the compound itself or as a concentrate. Example of the polymers into which the polysiloxane can be compounded include polypropylene, polyethylene, polystyrene, polyamides, polyacetal, acrylonitrile-butadiene-styrene (ABS), and polyester elastomer, all of which are commercially available. Silicone modified Hytrel™ is available commercially as BY27-010 (or MB50-010), and silicone modified Nylon 6,6 is available commercially as BY27-005, both from Dow Corning Company, Midland, Mich. Typically, commercially available concentrates may contain a polysiloxane at a weight percent ranging from 40 to 50; however, any weight percent is acceptable for purposes of the invention as long as the desired weight percent in the final product can be achieved. Lubricants preferably can be present in the moldable polymer 26 in amounts of up to about 20 percent by weight (exclusive of abrasive particle content), and preferably in an amount from about 1 to 10 percent, although more or less may be used as desired.

Coupling Agent

The moldable polymeric material 28 may include a coupling agent to improve the bond between the binder and the abrasive particles as is known in the art. Examples of such coupling agents suitable for this invention include organo silanes, zircoaluminates and titanates. The abrasive particles 26 may be pretreated with a coupling agent prior to being with the moldable polymer. Alternatively, the coupling agent may be added directly to the moldable polymer 28.

Fillers

The moldable polymeric material 28 may include a filler as is known in the art. Examples of useful fillers for this invention include: metal carbonates (such as calcium carbonate (chalk, calcite, marl, travertine, marble and limestone), calcium magnesium carbonate, sodium carbonate, magnesium carbonate), silica (such as quartz, glass beads, glass bubbles and glass fibers) silicates (such as talc, clays, (montmorillonite) feldspar, mica, calcium silicate, calcium metasilicate, sodium aluminosilicate, sodium silicate) metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide (lime), aluminum oxide, titanium dioxide) and metal sulfites (such as calcium sulfite).

Grinding Aids

The polymeric material may include a grinding aid. A grinding aid is defined herein as particulate material that the addition of which has a significant effect on the chemical and physical processes of abrading which results in improved performance. In particular, it is believed in the art that the grinding aid will either 1) decrease the friction between the abrasive particles and the workpiece being abraded, 2) prevent the abrasive particle from "capping", i.e. prevent metal particles from becoming welded to the tops of the abrasive particles, 3) decrease the interface temperature between the abrasive particles the workpiece, or 4) decreases the grinding forces. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include, tin, lead, bismuth, cobalt, antimony, cadmium, iron, and titanium. Other miscellaneous grinding aids include sulfur, organic sulfur compounds, graphite and metallic sulfides.

Injection Molding

The abrasive brush of the present invention is preferably injection molded. The mold will contain cavities which are the inverse of the desired abrasive brush configuration. Thus the mold design must take into account the abrasive brush configuration including the size and configuration of the base 12, the bristles 18, and the optional attachment means 30.

Figure 8:
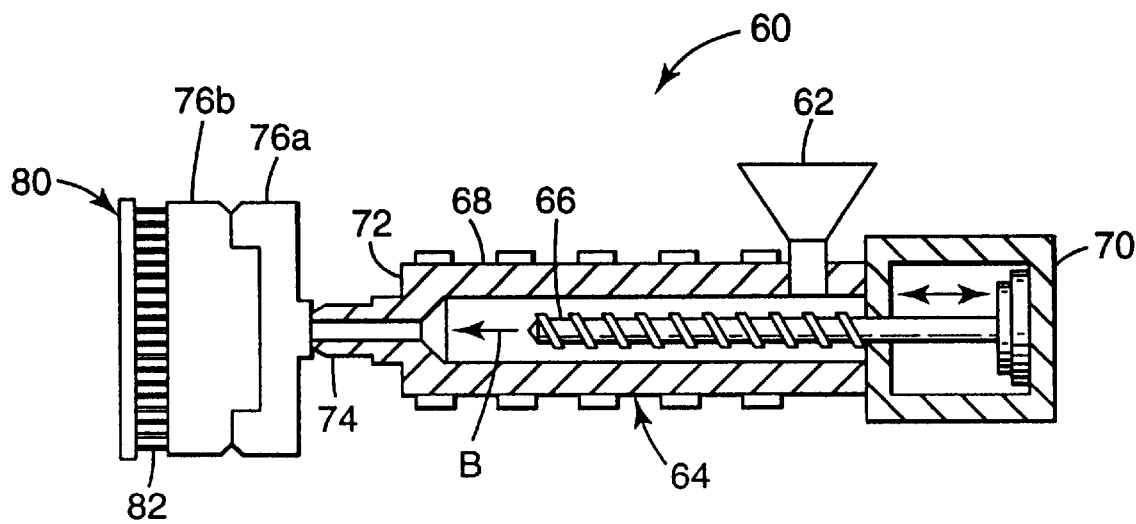
FIG. 8 is a schematic illustration of an apparatus and method for carrying out the present invention.

Injection molding techniques are known in the art. Injection molding apparatus 60 for making the abrasive brush 10 according to the method of the present invention is illustrated in FIG. 8. After preferably being dried by heating, a mixture of pellets comprising moldable polymer 28 and abrasive particles 26 is placed in a hopper 62. The hopper feeds the mixture into a first or rear side 70 of a screw injector 64 generally comprising a screw 66 within a barrel 68. The opposite side, or front side 72 of the screw injector 64 comprises a nozzle 74 for passing the softened mixture into a mold 76a, 76b. The barrel 68 of the injector 64 is heated to melt the mixture, and the rotating screw 66 propels the mixture in the direction of the nozzle 74. The screw 66 is then moved linearly frontward in direction B to impart the "shot" of the softened mixture into the mold 76a, 76b at the desired pressure. A gap is generally maintained between the forward end of the screw and the nozzle to provide a "cushion" area of softened material which is not injected into the mold.

The above mentioned pellets can be preferably prepared as follows. The moldable polymer 28 can be heated above its melting point and the abrasive particles 26 can then be mixed in. The resulting mixture is then formed into continuous strands and the strands are cooled to solidify the moldable polymer for pelletizing on suitable equipment as is known in the art. Likewise, lubricants and/or other additives to the polymeric material 28 can be included in the formation of the pellets. The pellets comprising the moldable polymer 28, abrasive particles 26, and any desired lubricant or other additive are then placed into the hopper 62 to be fed into the screw extruder 64 as described above. Alternatively, it is possible to mix the abrasive particles 26 with pellet form of the moldable polymer 28 and load this in the hopper. Likewise, lubricants and/or other additives to the polymeric material 28 can be mixed in prior to being loaded into the hopper.

The conditions under which the abrasive brush is injection molded are determined by the injection molder employed, the configuration of the brush 10, and the composition of the moldable polymer 28 and abrasive particles 26. In one preferred method, the moldable polymer 28 is first heated to between 80 to 120° C., preferably 90 to 110° C. for drying, and is placed in the hopper 62 to be gravity fed into the screw feed zone. The barrel temperature of the screw injector is preferably from about 200 to 250° C., more preferably from about 220 to 245° C. The temperature of the mold is preferably from about 50 to 150° C., more preferably from about 100 to 140° C. The cycle time (the time from introducing the mixture into the screw extruder to opening the mold to remove the molded abrasive brush) will preferably range between 0.5 to 180 seconds, more preferably from about 5 to 60 seconds. The injection pressure will preferably range from about 690 to 6,900 kPa (100 to 1000 psi), more preferably from about 2070 to 4830 kPa (300 to 700 psi).

The injection mold cycle will depend upon the material composition and the abrasive brush configuration. In one preferred embodiment, the moldable polymer and abrasive particles are generally homogenous throughout the abrasive brush 10. In such an embodiment, there will be a single insertion or shot of mixture of the polymeric material 28 and abrasive particle 26 to mold the brush 10, including the base 12, bristles 18, and attachment means 30 if present. Alternatively, the bristles 18 may contain abrasive particles 26, but the base 12 does not. In such an embodiment, there will be two insertions or shots of material. The first insertion will contain a mixture of moldable polymer 28 and abrasive particles 26 to primarily fill the bristle portion of the mold. The second insertion will contain moldable polymer (which may be the same or different from the moldable polymer of the first insertion) without abrasive particles to primarily fill the base and attachment means portions of the mold. Likewise, the base 12 and bristles 18 may contain abrasive particles, but the attachment means 30 may not. In this construction there will be two insertions or shot of material. The first insertion will contain a mixture of moldable polymer 28 and abrasive particles 26 to fill the bristle and base portions of the mold. The second insertion will contain only a moldable polymer (which may be the same or different from the moldable polymer of the first insertion) to primarily fill the attachment means portion of the mold. It is also possible to use more than one shot to vary the color of different portions of the brush if desired. It is also possible to employ three or more shots, for example one each for the bristles, base, and attachment means. After injection molding, the mold is rapidly cooled to solidify the moldable polymer. The mold halves 76a and 76b are then separated to allow removal of molded abrasive brush 10.

Figure 9:
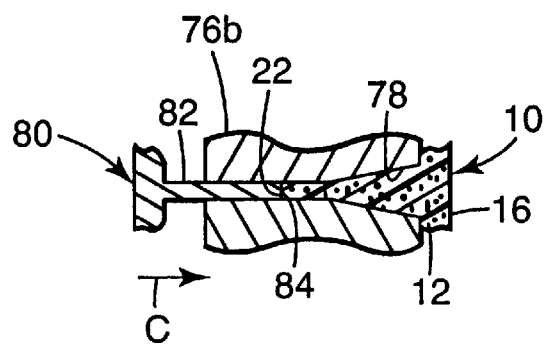
FIG. 9 is a partial cross sectional view of a mold and ejector according to the present invention.
Figure 10:
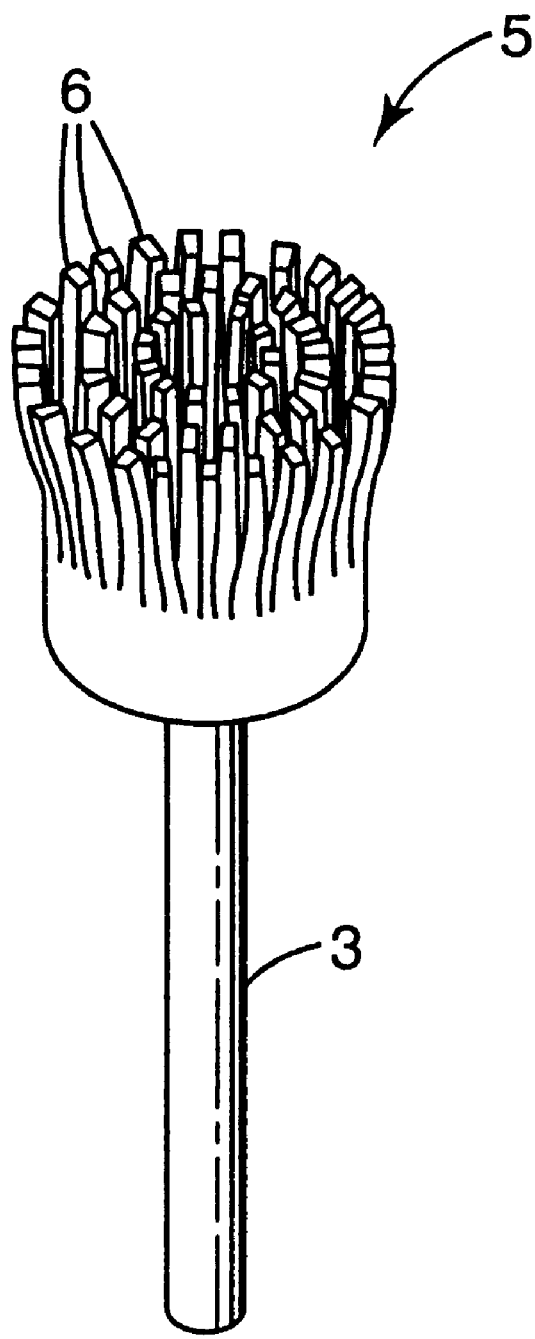
FIG. 10 is an isometric view of a known rotary tool.

Preferably, an ejector assembly 80 is provided on the opposite side of mold 76a, 76b from the injection port to eject the solidified abrasive brush 10 from the mold. As seen in FIG. 9, ejector pins 82 are preferably located in each mold cavity 78 which corresponds to a bristle 18. After the abrasive brush 10 is sufficiently cooled and mold portion 76a has been removed, tips 84 of ejector pins 82 are forced to move against the tip 22 of the bristle in direction C towards the base 12, to thereby eject the bristles 18 from their respective cavities. In one preferred embodiment, the location of the tips 84 of ejector pins 82 within the cavity is variable, thereby varying the depth of the mold cavity 78 allowing for longer or shorter bristles 18 to be molded. This can be done by varying the position of ejector 80 relative to mold portion 76b, or by varying the length of the ejector pins 82 on the ejector 80.

Method of Refining a Surface

As discussed above, the molded abrasive brush 10 according to the present invention is used to refine a surface by: removing a portion of a workpiece surface; imparting a surface finish to a workpiece; cleaning a workpiece surface, including removing paint or other coatings, gasket material, corrosion, or other foreign material; or some combination of the foregoing. The abrasive brush 10 is fastened by the attachment means to a suitable power rotary tool, and is particularly well adapted for use with right angle power tools as are known in the art. One suitable power tool for use the molded abrasive brush according to the present invention is the Ingersoll-Rand cyclone series right angle grinder, model TA 180 RG4, rated at 18,000 rpm and 0.70 hp. The molded abrasive brush 10 may mounted by itself on the rotary power tool, or may employ a back-up pad behind the abrasive brush 10 as is known in the art. One suitable back-up pad arrangement is that disclosed in to U.S. Pat. No.

3,562,968 (Johnson et al.), the entire disclosure of which is incorporated herein by reference.

Figure 11:
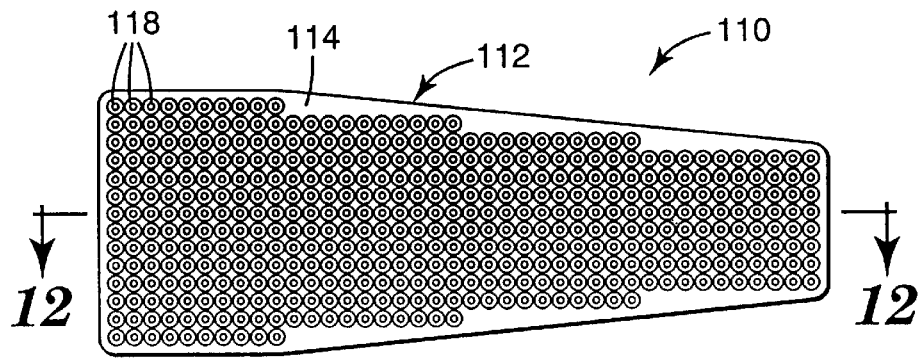
FIG. 11 is a plan view of an alternate embodiment of an abrasive brush made in accordance with the present invention.
Figure 12:
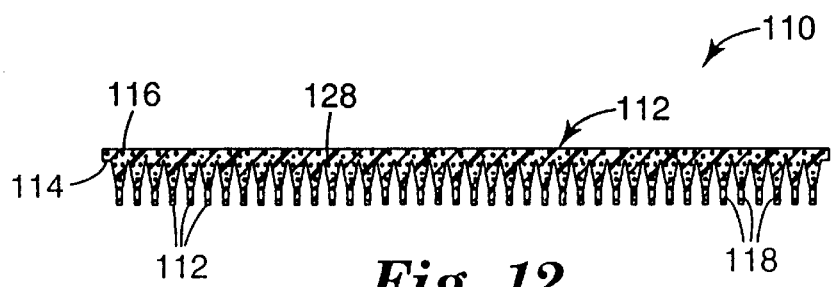
FIG. 12 is a cross-sectional view of the brush of FIG. 11 taken along plane 12—12.

Referring now to FIGS. 11 and 12, there is seen an alternate embodiment of molded abrasive brush 110 according to the present invention. Abrasive brush 110 comprises planar base 112 which is a generally wedge-shaped polygon as shown. Base 112 has first side 114 and second side 116 opposite one another. Extending from first side 114 are a plurality of bristles 118. Bristles 118 may be tapered to have root 120 wider than tip 122 for all or a portion of the length of bristles 118 as described above with respect to the embodiment of FIGS. 1 and 2.

Figure 13:
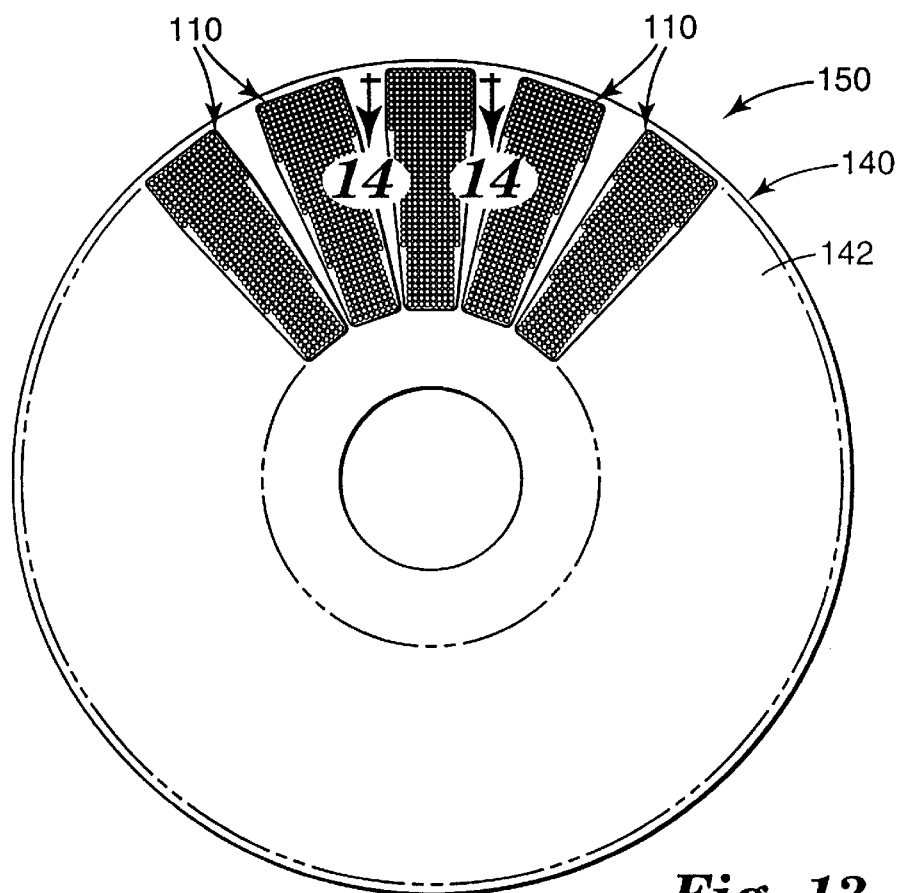
FIG. 13 is a plan view of a brush assembly according to the present invention having a plurality of abrasive brushes mounted on a backing.

While abrasive brush 110 is configured for convenient use with rotary floor machines commonly used in floor maintenance procedures, its utility is not thereby limited. As seen in FIG. 13, a plurality of abrasive brushes 110 may be mounted on a suitable backing 140 to form assembly 150. Suitable backings 140 include those available commercially as INSTA LOK™ drive assembly from Minnesota Mining and Manufacturing Company, St. Paul, Minn., which have been modified to have abrasive brushes 110 mounted thereon as described below. Backing 140 may be attached to rotary floor machines as is known in the art for refining a floor surface.

Preferably, abrasive brushes 110 are generally wedge-shaped and are arranged on backing 140 so as to have gaps therebetween where first surface 142 of backing 140 has no bristles 118. Abrasive brushes 110 may be preferably arranged in a substantially equal angular spacing around the backing 140. The segmented arrangement of bristles 118 and abrasive brushes 110 on backing 140 in combination with the generally parallel bristles 118 creates a series of "edges" which may allow the bristles 118 to reach recesses in an uneven surface, thus providing a treatment efficiency greater than a similar brush assembly without a segmented treatment surface. The segmented arrangement also aids in reducing the amount of material which accumulates in the bristles 118. The open areas between brushes 110 provide space for material to accumulate and thereby lengthen the service life of the abrasive brush 110. The gaps also reduce the number of bristles 118 on a given backing 140 which results in an increased pressure on the remaining bristles 118 during operation. The remaining bristles 118 must each support a greater force, and the resultant increase in pressure at the tips 122 of the bristles 118 further aids in improving the treatment efficiency of the inventive brush assembly. Alternatively, brushes 110 may be arranged to provide an uninterrupted arrangement of bristles 118 on backing 140. Or, a single brush 110 may be provided with a circular backing 112 conforming generally to the size of backing 140.

Abrasive brush 110 may comprise any of the moldable polymers 128, additives, and abrasive particles 126 as described above with reference to the embodiments of FIGS. 1–9. Abrasive brush 110 may omit abrasive particles 126. For applications such as floor scrubbing and polishing, one suitable moldable polymer 128 comprises polyester-based TPE such as is commercially available as Hytrel™ 5526 from E. I. Du Pont de Nemours, Wilmington Del., and 30% by weight 120 grade silicon carbide as abrasive particles 126.

It is possible to employ a plurality of like abrasive brushes 110 on an assembly 150. Alternatively, the abrasive brushes 110 may differ within a single assembly 150. For instance, it may be possible to employ abrasive brushes 110 having different moldable polymer 128, abrasive particles 126, length or arrangement of bristles 118, or any other parameter. It is also possible to employ bristles 118 having varying heights within a single abrasive brush 110.

Figure 14A:
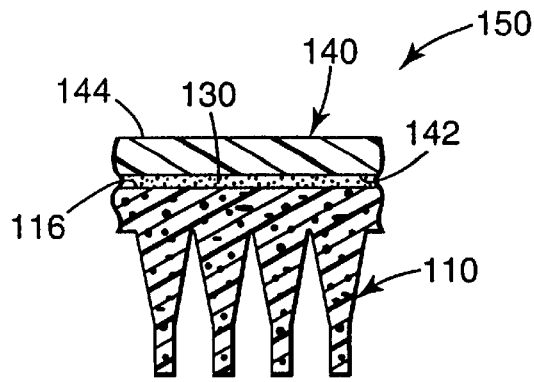
FIGS. 14A–14D are cross-sectional views taken along plane 14—14 of the brush assembly of FIG. 13, showing alternate embodiments of means for mounting the abrasive brushes on the backing.

Abrasive brushes 110 may be permanently or removably secured to backing 150. As seen in FIG. 14A, second side 116 of brush 110 may be joined to first side 142 of backing 140 by adhesive layer 130. Adhesive 130 may comprise any suitable adhesive including pressure sensitive adhesives and heat activated adhesives. Alternatively, the materials for abrasive brush 110 and backing 140 may be chosen to allow attachment by sonic welding.

Figure 14B:
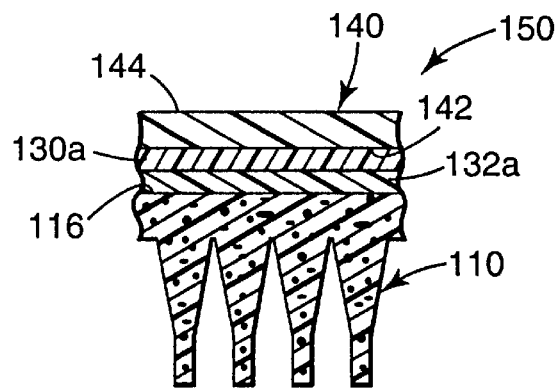

Abrasive brush 110 may be mechanically secured to backing 140 by means of screws, bolts, rivets, clamps or the like. It is also possible to employ attaching layer 130a on first side 142 of backing 140 and complementary attaching layer 132a on second side 116 of abrasive brush 110 as illustrated schematically in FIG. 14B. Attachment layers 130a and 132a may comprise a book and loop type attachment system such as that taught in U.S. Pat. No. 5,077,870, "Mushroom-Type Hook Strip for a Mechanical Fastener," (Melbye et al.) or of the type commercially available as SCOTCHMATE™ from Minnesota Mining and Manufacturing Company, St. Paul, Minn. It is also possible to use a hermaphroditic fastener such as DUAL LOCK™ fastener, available from Minnesota Mining and Manufacturing Company, to secure the abrasive brush to a back up pad. It is also possible to employ intermeshing structured surfaces such as taught in U.S. Pat. No. 4,875,529, "Intermeshing Articles" (Appeldorn).

Figure 14C:
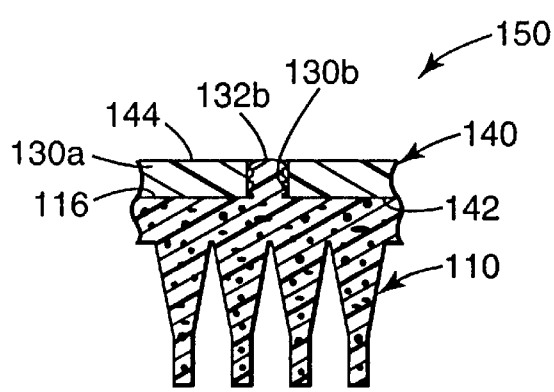
Figure 14D:
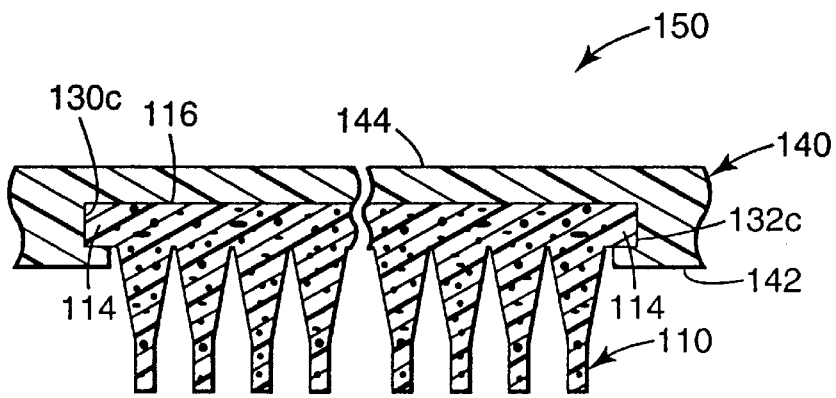

Abrasive brush 110 may be releasably secured to backing 140 by means of an integrally molded stud 130b extending from second side 116 of backing 112 as illustrated in FIG. 14C. Stud 130b is sized and configured to releasably engage with hole 130b in backing 140. Alternatively, backing 140 may comprise slots 130c to slidingly engage rails 132c in backing 112 of brush 110 as illustrated in FIG. 14D.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

The injection molding machine used was a 75 ton Van Dorn single shot extruder with a toggle clamping system, a 54 gram (3 ounce) barrel and a general purpose screw.

Molding parameters varied for each example due to formulation changes, mold design, mold condition, screw condition, and barrel condition. Typical molding parameters included: nozzle temperature 232° C. (450° F.), temperature at the front of the barrel (proximate the nozzle) 226° C. (440° F.), temperature at the rear of the barrel (proximate the hopper) 221° C. (430° F.), screw rotation 450 RPM, 2760–3450 kPa (400–500 psi) injection pressure, 5.1 mm (0.200 in) cushion, and a 7.37 cm (2.90 in) shot distance or length. A complete cycle time on average was about 36 seconds per abrasive brush.

The formulations used for the examples are reported in Table 1. Listed are the polymer components used, and the type and amount of abrasive particles. Prior to molding, each of the compounds was dried at 65° C. (150° F.) for 4 hours in a Bryant air dryer. The base 12 of the abrasive brushes 10 had a diameter of 5 cm (2 in), and a thickness of 2.54 mm (0.1 in.). The abrasive brush 10, had 254 integrally molded bristles 18. Each bristle 18 was 1.27 mm (0.50 in) long and tapered from 2.54 mm (0.10 in) diameter at the root to 1.27 mm (0.05 in) diameter at 80% of the length from root 20 to tip 22, and had a diameter of 1.27 mm (0.05 in) for the remainder of the length to tip 22. In some abrasive brushes, the fillet radius at the transition from the bristle to the base was approximately 0.25 mm (0.01 in) reported as fillet A in Table 2. Other abrasive brushes had a fillet radius of approximately 0.64 mm (0.025 in) reported as fillet B in Tables 3. Each abrasive brush 10 included an integrally molded threaded stud as the attachment means 30 according to U.S. Pat. No. 3,562,968 (Johnson et al.).

The following components were used in preparing the examples described below:

Moldable Polymer

| MOLDABLE POLYMER: | |
|---|---|
| Hytrel ™ | polyester-based TPE, available from E.I. Du Pont de Nemours and Company, Inc., Wilmington, Delaware. |
| Lubricomp ™YL-4030 | polyester based TPE, including 15% PTFE lubricant; |
| Lubricomp ™YF-1004 | polyester based TPE, including 20% glass fiber reinforcement; |
| Lubricomp ™YC-1004 | polyester based TPE, including 20% carbon fiber reinforcement; all available from LNP Engineering Plastics, of Exton, PA. |
| Lomad ™ Resin B0100 | polyester based TPE available from General Electric Co., of Pittsfield, MA. |
| Estane ™ | polyurethane-base TPE availabie from B.F. Goodrich, Cleveland, Ohio. |
| Pebax ™ 5533 SA 00 | nylon-based TPE, available from Atochem Inc, Glen Rock, New Jersey. |
| Duraflex ™ 0110 | polybutylene TP available from Shell Chemical Co. of Houston, TX. |
| Profax ™KS075P | polypropylene-based TP; |
| Profax ™KS084P | polypropylene-based TP, both available from Himont USA Inc. of Wilmington, DE. |
| Grilon ™ CR9 | Nylon 6, 12 TP, available from EMS-American Grilon, Inc., of Sumter, SC. |
| LUBRICANTS | |
| BY27-005 | polyamide-based polymer melt additive; |
| BY27-010 (or MB50-010) | polyester elastomer-based polymer melt additive; both available from Dow Corning Company, Midland, Michigan. |
| COUPLING AGENTS | |
| silane | silane coupling agent, typically amine functional such as gamma-aminopropyltri-ethoxysilane, available as A-1100, or −1102 from Union Carbide Corporation, New York, NY. |
| Z-6030 | methacrylate functional silane coupling agent; |
| Z-6075 | vinyl functional silane coupling agent; both available from Dow Corning Corporation, Midland, Michigan. |

| ABRASIVE PARTICLES | |
|---|---|
| SiC | silicon carbide |
| Al₂O₃ | fused aluminum oxide, pretreated by Exolon ESK Company, Tonawanda, NY, or Washington Mills Electro Minerals Corp., North Grafton, MA. |
| Al₂O₃ (h) | heat treated fused aluminum oxide |
| CA01 | alpha alumina-based ceramic comprising alpha alumina and a rare earth oxide, commercially available under the designation Cubitron ™ 321 from Minnesota Mining and Manufacturing Company, St. Paul, MN. |
| CA02 | mixture of 15% CA01 and 85% scalped fused alumina |
| CA03 | mixture of 15% CA01 and fused alumina |
| CA04 | alpha alumina-based ceramic comprising 94.3% alumina, 4.5% aluminum oxide, and 1.2% iron oxide. |
| MC-3 | 30/40 mesh size untreated plastic blasting media available from Maxi-Blast Company of South Bend, Indiana. |

All compositions are reported throughout as weight ratios or percent by weight as the case may be, unless otherwise indicated. The percent composition for the components of the moldable polymer is reported based on 100% for the combination of the components of the moldable polymer exclusive of the abrasive particles. The abrasive content is reported as the percent composition of the abrasive particles based on 100% for the combination of the components of the moldable polymer with the abrasive particles.

Examples 1–41

The Composition of Examples 1–41 is Set Forth in Table 1.

TABLE 1

| | | | Abrasive Particles | | |
|---|---|---|---|---|---|
| | Moldable Polymer | | | Coupling | Abrasive |
| Ex. | TP and/or TPE | Lubricant | Particle | Agent | Content |
| 1 | 90% CR9 | 10% BY27-005 | SiC - 80 grit | — | 30% |
| 2 | 90% Hytrel 7246 | 10% BY27-010 | SiC - 80 grit | — | 40% |

TABLE 1-continued

| Ex. | Moldable Polymer TP and/or TPE | Lubricant | Abrasive Particles Particle | Coupling Agent | Abrasive Content |
|---|---|---|---|---|---|
| 3 | 90% Hytrel 6356 | 10% BY27-010 | SiC - 80 grit | — | 40% |
| 4 | 50% Hytrel 7246 | 50% YL-4030 | SiC - 80 grit | — | 30% |
| 5 | 50% Hytrel 7246 | 50% YL-4030 | CA04 - 80 grit | — | 30% |
| 6 | 84% Hytrel 6356 | 16% BY27-010 | $Al_2O_3$- P60 grit | — | 30% |
| 7[1] | 84% Hytrel 6356 | 16% BY27-010 | $Al_2O_3$- P60 grit | — | 30% |
| 8 | 84% YF-1004 | 16% BY27-010 | $Al_2O_3$- P60 grit | — | 30% |
| 9[1] | 84% YF-1004 | 16% BY27-010 | $Al_2O_3$- P60 grit | — | 30% |
| 10 | 84% Hytrel 6356 | 16% BY27-010 | $Al_2O_3$- P120 grit | — | 30% |
| 11 | 84% YF-1004 | 16% BY27-010 | $Al_2O_3$- P120 grit | — | 30% |
| 12 | 84% YF-1004 | 16% BY27-010 | CA01 - 80 grit | — | 30% |
| 13[2] | 84% YF-1004 | 16% BY27-010 | CA01 - 80 grit | — | 30% |
| 14 | 84% YF-1004 | 16% BY27-010 | CA01 - 120 grit | — | 30% |
| 15 | 84% Hytrel 6356 | 16% BY27-010 | CA02 - 60 grit | — | 30% |
| 16[1] | 84% Hytrel 6356 | 16% BY27-010 | CA02 - 60 grit | — | 30% |
| 17 | 90% Hytrel 5526 | 10% BY27-010 | $Al_2O_3$ - 80 grit | — | 25% |
| 18 | 90% Hytrel 5526 | 10% BY27-010 | $Al_2O_3$ - 80 grit | — | 30% |
| 19 | 90% Hytrel 5526 | 10% BY27-010 | $Al_2O_3$ - 80 grit | silane | 25% |
| 20 | 90% Hytrel 5526 | 10% BY27-010 | $Al_2O_3$ - 80 grit | silane | 30% |
| 21 | 94% YC-1004 | 10% BY27-010 | $Al_2O_3$ - 80 grit | silane | 30% |
| 22 | 100% KS075P | — | $Al_2O_3$ - 80 grit | silane | 35% |
| 23 | 100% KS084P | — | $Al_2O_3$ - 80 grit | silane | 35% |
| 24 | 100% KS084P | — | $Al_2O_3$ - 80 grit | silane | 35% |
| 25 | 51% Hytrel 5526 23.5% YC-1004 | 25.5% YL-4030 (3.8% PTFE) | $Al_2O_3$ - 80 grit | silane | 30% |
| 26 | 78% Hytrel 5526 10% YC-1004 | 12% BY27-010 | $Al_2O_3$ - 80 grit | silane | 30% |
| 27 | 90% Hytrel 5526 | 10% BY27-010 | $Al_2O_3$ - 80 grit | Z-6030 | 30% |
| 28 | 90% Hytrel 5526 | 10% BY27-010 | $Al_2O_3$ - 80 grit | Z-6075 | 30% |
| 29 | 90% Hytrel 5526 | 10% BY27-010 | $Al_2O_3$ - 60 grit | silane | 30% |
| 30[1] | 90% Hytrel 5526 | 10% BY27-010 | $Al_2O_3$ - 60 grit | silane | 30% |
| 31 | 90% Hytrel 5526 | 10% BY27-010 | $Al_2O_3$ - 60 grit | silane | 30% |
| 32[1] | 90% Hytrel 5526 | 10% BY27-010 | $Al_2O_3$ - 60 grit | silane | 30% |
| 33 | 90% Pebax | 10% BY27-010 | $Al_2O_3$ - 60 grit | silane | 30% |
| 34 | 90% Duraflex | 10% BY27-010 | $Al_2O_3$ - 60 grit | silane | 30% |
| 35 | 90% B0100 | 10% BY27-010 | $Al_2O_3$ - 60 grit | silane | 30% |
| 36 | 90% Estane 58092 | 10% BY27-010 | $Al_2O_3$ - 60 grit | silane | 30% |
| 37 | 90% Estane 58091 | 10% BY27-010 | $Al_2O_3$ - 60 grit | silane | 30% |
| 38 | 90% Hytrel 5526 | 10% BY27-010 | $Al_2O_3$ - 50 grit | silane | 30% |
| 39 | 90% Hytrel 5526 | 10% BY27-010 | SiC - 60 grit | — | 30% |
| 40 | 90% Hytrel 5526 | 10% BY27-010 | CA02 - 60 grit | — | 30% |
| 41 | 90% Hytrel 5526 | 10% BY27-010 | MC3 - 30/40 mesh | — | 30% |

[1]molded polymer included orange pigment
[2]molded polymer included yellow pigment Performance Testing Individual abrasive brushes 10 were tested on an apparatus that applied a load of 1.8 kg (4 lb.) for 20 seconds, then lifted for 11 seconds. This was repeated for 30 cycles for a total test time of 10 minutes on the workpiece. The workpiece was a flat plate of 5052 aluminum, 38.1×38.1 cm×0.32 cm (15×15×⅛ inch) with a 0.64 cm (¼ inch) central hole to mount it on the test apparatus. The plate was rotated at about 1 revolution every 3 minutes. The abrasive brushes were mounted on an Ingersoll-Rand cyclone series right angle grinder, model TA 180 RG4 rated at 18,000 rpm and 0.70 hp. The abrasive brush was run at 18,000 RPM free spinning (actual RPM under load was somewhat less). The abrasive brush was held at a 7° angle to the workpiece. The weight loss of the plate is recorded as cut. The weight loss and length reduction of the bristles of the abrasive brush are recorded as wear. Finish, Ra, was recorded after performance testing, and may not be as good as optimally attainable for each particular example, because the performance testing results in multiple passes being made over the same area of the workpiece. The results reported are the average of two brushes of the same composition, unless otherwise noted. Some compositions were tested both with fillet A and fillet B, some were not tested using this method.

TABLE 2

| | | | (fillet A) | | |
|---|---|---|---|---|---|
| Example | Cut, g | Wear, g | Wear, mm (in) | Broken Bristles | Ra Finish (micro inch) |
| 2 | 2.9 | 0.6 | 1.83 (0.072) | 0 | 29 |
| 4 | 3.5 | 0.7 | 0.99 (0.039) | 7 | 36 |
| 6 | 12.8 | 0.9 | 1.52 (0.060) | 9 | 42 |
| 8 | 10.4 | 1.8 | 1.78 (0.070) | 27 | 41 |
| 10 | 4.4 | 0.7 | 0.89 (0.035) | 8 | 27 |
| 15 | 13.9 | 1.1 | 1.47 (0.058) | 14 | 46 |

TABLE 3

(fillet B)

| Example | Cut, g | Wear, g | Wear, mm (in) | Broken Bristles | Ra Finish (micro inch) |
|---|---|---|---|---|---|
| 6 | 13.8 | 0.9 | 1.37 (0.054) | 8 | 40 |
| 15 | 15.3 | 1.1 | 1.85 (0.073) | 8 | 51 |
| 18 | 9.8 | 0.8 | 1.27 (0.050) | 0 | 34 |
| 19 | 12.0 | 0.9 | 1.63 (0.064) | 0 | 36 |
| 20 | 12.2 | 0.9 | 1.75 (0.069) | 0 | 33 |
| 20 | 12.5 | 0.9 | 1.63 (0.064) | 0 | 40 |
| 23[1] | | | | | |
| 25 | 6.0 | 0.5 | 0.89 (0.035) | 5 | 35 |
| 26 | 12.1 | 0.9 | 1.63 (0.064) | 1 | 36 |
| 27 | 10.9 | 0.9 | 1.60 (0.063) | 0 | 39 |
| 28 | 10.9 | 0.8 | 1.55 (0.061) | 0 | 34 |
| 29 | 16.4 | 1.2 | 2.01 (0.079) | 3 | 46 |
| 30 | 17.1 | 1.7 | 2.11 (0.083) | I | 42 |
| 31 | 15.2 | 1.1 | 1.75 (0.069) | 0 | 42 |
| 32 | 15.1 | 1.1 | 1.80 (0.071) | 0 | 42 |
| 33 | 3.0 | 0.1 | 0.13 (0.005) | 0 | 45 |
| 34[2] | | | | | |
| 35[3] | | | | | |
| 36[4] | | | | | |
| 37[5] | | | | | |
| 38 | 21.4 | 1.5 | 2.54 (0.100) | 1 | 50 |
| 39 | 13.0 | 1.2 | 2.01 (0.079) | 2 | 37 |
| 40 | 20.3 | 1.8 | 2.87 (0.113) | 9 | 49 |
| 41[6] | 0 | 0 | 0.00 (0.000) | 0 | N.A. |

[1]bristles melted, only one brush tested
[2]failed at 1 & 10 cycles - melted bristles
[3]attaching means failed at 10 & 18 cycles
[4]attaching means faiied at 3 & 4 cycles
[5]failed at 10 & 30 cycles - melted bristles
[6]plastic abrasive particles Examples 42–70

Performance Testing

Performance testing was the same as for examples 1–41, except for the following. All examples had a fillet radius of approximately 0.025 inches. Results for the aluminum test pieces are the average of two tests, results for cold rolled steel (CRS) are a single test, results for stainless steel (SS) are a single test. Microfinish (reported as Ra and Rz in micro-inches) is the result after hand testing a particular brush example on a different test piece than that used for the performance testing, with the finish prior to refining the surface being (in micro-inches):

| | | |
|---|---|---|
| aluminum | Ra: 7 | Rz: 40 |
| CRS | Ra: 31 | Rz: 151 |
| Stainless Steel | Ra: 11 | Rz: 72 |

Composition of the example abrasive brushes is reported in Table 4, test results on aluminum in Table 5, tests results on cold rolled steel in Table 6 (not all examples tested); test results on stainless steel in Table 7 (not all examples tested). No broken bristles were observed in Examples 42–70.

TABLE 4

| | Moldable Polymer | | Abrasive Particles | | |
|---|---|---|---|---|---|
| Ex. | TP and/or TPE | Lubricant | Particle | Coupling Agent | Abrasive Content |
| 42 | 90% Hytrel 5526 | 10% BY27-010 | $Al_2O_3$ - 80 grit | silane | 30% |
| 43 | 90% Hytrel 5526 | 10% BY27-010 | $Al_2O_3$ - 50 grit | silane | 30% |
| 44 | 80% Hytrel 5526 | 20% BY27-010 | $Al_2O_3$ - 600 grit | — | 30% |
| 45 | 80% Hytrel 5526 | 20% BY27-010 | $Al_2O_3$ - 400 grit | — | 30% |
| 46 | 80% Hytrel 5526 | 20% BY27-010 | $Al_2O_3$ - 320 grit | — | 30% |
| 47 | 80% Hytrel 5526 | 20% BY27-010 | $Al_2O_3$ - 220 grit | — | 30% |
| 48 | 80% Hytrel 5526 | 20% BY27-010 | $Al_2O_3$ - 220 grit | silane | 30% |
| 49 | 80% Hytrel 5526 | 20% BY27-010 | SiC - 220 grit | — | 26% |
| 50 | 80% Hytrel 5526 | 20% BY27-010 | $Al_2O_3$ - 180 grit | — | 30% |
| 51 | 80% Hytrel 5526 | 20% BY27-010 | $Al_2O_3$ - 150 grit | silane | 30% |
| 52 | 80% Hytrel 5526 | 20% BY27-010 | $Al_2O_3$ - 120 grit | silane | 30% |
| 53 | 80% Hytrel 5526 | 20% BY27-010 | $Al_2O_3$ - 120 grit | — | 30% |
| 54 | 80% Hytrel 5526 | 20% BY27-010 | SiC - 120 grit | — | 26% |
| 55 | 80% Hytrel 5526 | 20% BY27-010 | $Al_2O_3$ - 100 grit | silane | 30% |
| 56 | 80% Hytrel 5526 | 20% BY27-010 | $Al_2O_3$ (h) 80 grit | — | 30% |
| 57 | 80% Hytrel 5526 | 20% BY27-010 | $Al_2O_3$ - 80 grit | — | 30% |
| 58 | 80% Hytrel 5526 | 20% BY27-010 | $Al_2O_3$ - 80 grit | silane | 30% |
| 59 | 80% Hytrel 5526 | 20% BY27-010 | CA02 - 80 grit | — | 30% |
| 60 | 80% Hytrel 5526 | 20% BY27-010 | CA03 - P120 grit | — | 30% |
| 61 | 80% Hytrel 5526 | 20% BY27-010 | CA03 - P220 grit | — | 30% |
| 62 | 80% Hytrel 5526 | 20% BY27-010 | $Al_2O_3$ - 60 grit | silane | 30% |
| 63 | 80% Hytrel 5526 | 20% BY27-010 | $Al_2O_3$ - 50 grit | silane | 30% |
| 64 | 80% Hytrel 5526 | 20% BY27-010 | $Al_2O_3$ - 50 grit | — | 30% |
| 65 | 80% Hytrel 5526 | 20% BY27-010 | SiC - 50 grit | — | 26% |
| 66 | 80% Hytrel 5526 | 20% BY27-010 | CA02 - 50 grit | silane | 30% |
| 67 | 80% Hytrel 5526 | 20% BY27-010 | $Al_2O_3$ - 120 grit | silane | 30% |
| 68 | 80% Hytrel 5526 | 20% BY27-010 | $Al_2O_3$ - 50 grit | silane | 30% |
| 69 | 100% Pebax 5533 | — | $Al_2O_3$ - 50 grit | silane | 30% |
| 70 | 90% Pebax 5533 | 10% BY27-010 | $Al_2O_3$ - 60 grit | silane | 40% |

TABLE 5

(results on aluminum)

| Example | Cut, g | Wear, g | Wear, mm (in) | Ra | Rz |
|---|---|---|---|---|---|
| 42 | 11.8 | 0.7 | 1.52 (0.060) | 39.0 | 254 |
| 43 | 16.7 | 1.2 | 2.13 (0.084) | 56.5 | 336 |
| 44 | 0.2 | 0.1 | 0.33 (0.013) | 6.7 | 45 |
| 45 | 0.2 | 0.2 | 0.33 (0.013) | 9.1 | 59 |
| 46 | 0.4 | 0.1 | 0.28 (0.011) | 7.1 | 48 |
| 47 | 2.0 | 0.2 | 0.64 (0.025) | 8.8 | 58 |
| 48 | 2.0 | 0.2 | 0.61 (0.024) | 11.5 | 73 |
| 49 | 2.1 | 0.3 | 0.71 (0.028) | 10.6 | 69 |
| 50 | 2.2 | 0.2 | 0.61 (0.024) | 12.9 | 82 |
| 51 | 2.6 | 0.4 | 0.66 (0.026) | 16.5 | 103 |
| 52 | 4.2 | 0.4 | 0.86 (0.034) | 19.2 | 116 |
| 53 | 3.9 | 0.3 | 0.76 (0.030) | 17.3 | 108 |
| 54 | 2.7 | 0.3 | 0.86 (0.034) | 17.5 | 114 |
| 55 | 6.7 | 0.4 | 0.97 (0.038) | 23.5 | 141 |
| 56 | 12.2 | 0.7 | 1.37 (0.054) | 33.0 | 197 |
| 57 | 10.3 | 0.7 | 1.12 (0.044) | 26.9 | 157 |
| 58 | 11.3 | 0.7 | 1.35 (0.053) | 31.0 | 178 |
| 59 | 12.5 | 0.8 | 1.45 (0.057) | 40.5 | 224 |
| 60 | 5.9 | 0.4 | 0.94 (0.037) | 23.0 | 138 |
| 61 | 2.1 | 0.2 | 0.76 (0.030) | 11.6 | 74 |
| 62 | 13.7 | 0.8 | 1.62 (0.060) | 40.0 | 227 |
| 63 | 17.4 | 1.0 | 1.70 (0.067) | 39.5 | 223 |
| 64 | 16.5 | 0.9 | 1.75 (0.069) | 52.0 | 298 |
| 65 | 10.0 | 0.9 | 1.65 (0.065) | 34.5 | 192 |
| 66 | 19.6 | 1.1 | 2.03 (0.080) | 46.0 | 286 |
| 67 | 4.0 | 0.3 | 0.84 (0.033) | 18.1 | 120 |
| 68 | 17.6 | 1.0 | 1.85 (0.073) | 55.0 | 344 |
| 69 | 2.8 | 5.2 | 8.99 (0.354) | 54.0 | 320 |
| 70 | 2.8 | 0.1 | 0.18 (0.007) | 39.5 | 242 |

TABLE 6

(results on cold rolled steel)

| Example | Cut, g | Wear, g | Wear, mm (in) | Ra | Rz |
|---|---|---|---|---|---|
| 47 | 0.3 | 0.1 | 0.025 (0.001) | 22 | 112 |
| 48 | 0.4 | 0.0 | 0.076 (0.003) | 23 | 113 |
| 49 | 0.5 | 0.0 | 0.10 (0.004) | 20 | 109 |
| 52 | 0.8 | 0.1 | 0051 (0.002) | 16 | 84 |
| 53 | 0.6 | 0.1 | 0.076 (0.003) | 21 | 116 |
| 54 | 0.9 | 0.1 | 0.15 (0.006) | 18 | 97 |
| 56 | 1.6 | 0.0 | 0.13 (0.005) | 25 | 152 |
| 57 | 1.1 | 0.0 | 0.13 (0.005) | 24 | 150 |
| 58 | 1.3 | 0.0 | 0.076 (0.003) | 23 | 142 |
| 59 | 1.9 | 0.0 | 0.051 (0.002) | 20 | 119 |
| 60 | 1.0 | 0.0 | 0.10 (0.004) | 18 | 106 |
| 61 | 0.5 | 0.1 | 0.076 (0.003) | 17 | 87 |
| 63 | 4.2 | 0.0 | 0.13 (0.005) | 22 | 131 |
| 64 | 3.2 | 0.1 | 0.18 (0.007) | 29 | 176 |
| 65 | 2.5 | 0.1 | 0.23 (0.009) | 15 | 95 |
| 66 | 4.7 | 0.1 | 0.15 (0.006) | 30 | 177 |

TABLE 7

(results on stainless steel)

| Example | Bristle Melt[1] | Cut, g | Wear, g | Wear, mm (in) | Ra ($\mu$ in) | Rz ($\mu$ in) |
|---|---|---|---|---|---|---|
| 47 | 3 | 0.5 | 1.0 | 0.025 (0.112) | 5.4 | 39 |
| 48 | 1 | 0.4 | 0.0 | 0.076 (0.002) | 6.3 | 48 |
| 49 | 2 | 0.3 | 0.0 | 0.10 (0.019) | 4.8 | 40 |
| 52 | 2 | 0.8 | 0.1 | 0.051 (0.031) | 9.7 | 74 |
| 53 | 1 | 0.6 | 0.0 | 0.076 (0.010) | 8.5 | 60 |
| 54 | 2 | 0.8 | 0.1 | 0.15 (0.024) | 6.3 | 46 |
| 56 | 1 | 2.0 | 0.1 | 0.13 (0.003) | 14.5 | 103 |
| 57 | 3 | 2.2 | 0.5 | 0.13 (0.073) | 15.5 | 112 |
| 58 | 2 | 2.1 | 0.1 | 0.076 (0.016) | 10.7 | 80 |
| 59 | 1 | 2.2 | 0.0 | 0.051 (0.005) | 17.0 | 119 |

TABLE 7-continued (results on stainless steel)

| Example | Bristle Melt[1] | Cut, g | Wear, g | Wear, mm (in) | Ra ($\mu$ in) | Rz ($\mu$ in) |
|---|---|---|---|---|---|---|
| 60 | 3 | 1.4 | 0.4 | 0.10 (0.065) | 10.9 | 78 |
| 61 | 3 | 0.4 | 0.5 | 0.076 (0.056) | 6.9 | 50 |
| 63[2] | 3 | 0.5 | 1.6 | 0.13 (0.155) | 12.1 | 83 |
| 64[3] | 3 | 1.1 | 1.6 | 0.18 (0.151) | 18.6 | 126 |
| 65 | 1 | 1.5 | 0.1 | 0.23 (0.007) | 18.9 | 138 |
| 66[2] | 3 | 0.4 | 1.4 | 0.15 (0.142) | 20.6 | 142 |

[1]Bristle melt: 1 = none or negligible; 2 = minor; 3 = unacceptable (brush inoperative)
[2]Test stopped at 2 cycles
[3]Test stopped at 6 cycles Example 71

A molded abrasive brush 110 to be utilized on a rotary floor machine was prepared generally according to the embodiment of FIGS. 11–12 by injection molding a Hytrel™ 5526 polyester based thermoplastic elastomer (available from Du Pont) that was compounded to contain 30% by weight 120 grade silicon carbide abrasive. The material was pelletized after compounding. The pelletized compound was injection molded on a 75 ton Van Dorn press utilizing a mud set plastic injection prototype mold as described above with respect to examples 1–70. Mold temperature was 60° C. (140° F.) and melt temperature was approximately 237° C. (460° F.). Cycle time was 30 seconds. Part weight was 32.5 grams.

The base 112 was a generally wedge-shaped polygon, 10.5 cm (4.125 in) long by 3.8 cm (1.50 in) wide at one end and 2.2 cm (0.875 in) wide at the opposite end. Extending from one major surface were 440 bristles 118 each 1.9 cm (0.75 in ) long, 2.3 mm (0.090 in) diameter at the root and 1.0 mm (0.040 in) diameter at tip 122. The 9.5 mm (0.375 in) long portion of the bristle 118 adjacent tip 122 was cylindrical.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. For example, the abrasive brush according to the present invention may be provided with means for introducing fluid such as coolants, lubricants, and cleaning fluids to the workpiece during operation as is known in the art, such as by openings through the backing or bristles. Thus, the scope of the present invention should not be limited to the exact details and structures described herein, but rather by the structures described by the language of the claims, and the equivalents of those structures.

What is claimed is:

1. An integrally molded abrasive brush comprising:
    a flexible base having a first side and a second side, wherein said base is generally planar; and
    a plurality of bristles extending from said first side of said base, wherein said bristles have an aspect ratio of at least 2, and wherein said bristles are integrally molded with said base;
    wherein said molded abrasive brush comprises a thermoplastic elastomer and wherein said bristles include abrasive particles interspersed in said thermoplastic elastomer.

2. The molded abrasive brush of claim 1, wherein said bristles have an aspect ratio of at least 5.

3. The molded abrasive brush of claim 1, wherein said bristles have an aspect ratio of at least 7.

4. The molded abrasive brush of claim 1, wherein said bristles each comprise a root adjacent said base and a tip opposite said base, and wherein said bristles are tapered so as to be wider at said root than at said tip.

5. The molded abrasive brush of claim 4, wherein said bristles are tapered at a first portion adjacent said root, and wherein said bristles have a constant thickness at a second portion adjacent said tip.

6. The molded abrasive brush of claim 4, wherein said bristles include a fillet radius at the transition from said root to said base.

7. The molded abrasive brush of claim 1, further comprising an attachment means provided on said base for attaching said abrasive brush to a tool.

8. The molded abrasive brush of claim 7, wherein said attachment means comprises a threaded stud integrally molded with said base and extending from said second side of said base.

9. The molded abrasive brush of claim 1, wherein said thermoplastic elastomer comprises a polyester based thermoplastic elastomer.

10. The molded abrasive brush of claim 1, wherein said thermoplastic elastomer includes a lubricant.

11. The molded abrasive brush of claim 1, wherein said molded abrasive brush comprises a plurality of abrasive particles interspersed throughout said thermoplastic elastomer.

12. The molded abrasive brush of claim 1, wherein said abrasive particles comprise inorganic abrasive particles.

13. The molded abrasive brush of claim 1, wherein said abrasive particles comprise organic abrasive particles.

14. The molded abrasive brush of claim 1, wherein said base includes a reinforcing means for reinforcing said base.

15. The molded abrasive brush of claim 14, wherein said reinforcing means comprises a reinforcing substrate provided on said second side of said base.

16. The molded abrasive brush of claim 1, wherein said base is circular.

17. The molded abrasive brush of claim 1, wherein said base is polygonal.

18. The molded abrasive brush of claim 17 in combination with a backing having a first major surface, wherein said molded abrasive brush is mounted on said first major surface of said backing to thereby form a brush assembly.

19. The brush assembly of claim 18, wherein said backing is circular and said assembly comprises a plurality of said abrasive brushes mounted on said first major surface in an substantially equal angular spacing.

20. The molded abrasive brush of claim 10, wherein the lubricant comprises a polysiloxane lubricant.

21. An integrally molded abrasive brush comprising:
a circular base having a first side and a second side;
attachment means provided on said base for attaching said abrasive brush to a rotary tool, wherein said attachment means is centered relative to said base; and
a plurality of bristles extending from said first side of said base, wherein said bristles are integrally molded with said base;
wherein said molded abrasive brush comprises a thermoplastic elastomer, and wherein said bristles include abrasive particles interspersed in said thermoplastic elastomer.

22. The molded abrasive brush of claim 21, wherein said base is generally planar.

23. The molded abrasive brush of claim 21, wherein said thermoplastic elastomer is selected from the group consisting of: polyester-based thermoplastic elastomer, nylon-based thermoplastic elastomer, and polyurethane-based thermoplastic elastomer.

24. The molded abrasive brush of claim 21, wherein said thermoplastic elastomer comprises a polyester-based thermoplastic elastomer.

25. The molded abrasive brush of claim 21 in combination with a backing having a first major surface, wherein said molded abrasive brush is mounted on said first major surface of said backing to thereby form a brush assembly.

26. The brush assembly of claim 25, wherein said backing is circular and said assembly comprises a plurality of said abrasive brushes mounted on said first major surface in an substantially equal angular spacing.

27. The molded abrasive brush of claim 21, wherein the thermoplastic elastomer includes a lubricant.

28. The molded abrasive brush of claim 27, wherein the lubricant comprises a polysiloxane lubricant.

29. An integrally molded abrasive brush comprising:
a circular base having a first side and a second side;
a plurality of bristles extending from said first side of said base, wherein said bristles are integrally molded with said base; and
a threaded stud integrally molded with said base and extending from said second side of said base for attaching said abrasive brush to a tool to rotate said abrasive brush, wherein said threaded stud is centered relative to said base;
wherein said molded abrasive brush comprises a moldable polymeric material and wherein said bristles include abrasive particles interspersed in said moldable polymeric material.

30. An integrally molded abrasive brush comprising:
a circular base having a first side and a second side;
attachment means provided on said base for attaching said abrasive brush to a rotary tool, wherein said attachment means is centered relative to said base; and
a plurality of bristles extending from said first side of said base, wherein said bristles are integrally molded with said base;
wherein said molded abrasive brush comprises a moldable polymeric material and wherein said bristles include organic abrasive particles interspersed in said moldable polymeric material.

31. The molded abrasive brush of claim 30, wherein said molded abrasive brush includes a plurality of organic abrasive particles interspersed throughout said moldable polymeric material.

* * * * *

UNITED STATES PATENT AND TRADEMARK OFFICE
CERTIFICATE OF CORRECTION

PATENT NO. : 6,126,533
DATED : October 3, 2000
INVENTOR(S) : David E. Johnson et al.

It is certified that error appears in the above-identified patent and that said Letters Patent is hereby corrected as shown below:

<u>Title page,</u>
Item [56], References Cited, please add the following:

| | | | |
|---|---|---|---|
| -- 1,712,764 | 5/1929 | Hassler | 15/188 |
| 2,172,464 | 9/1939 | Anderson | 15/188 |
| 3,208,836 | 9/1965 | Biglin et al. | 51/293 |
| 3,670-,467 | 6/1972 | Walker | 51/298 |
| 3,675,263 | 7/1972 | Durham | 15/176 |
| 3,958,294 | 5/1976 | Thompson | 15/198 |
| 3,963,459 | 6/1976 | Vinard | 51/298 |
| 4,035,160 | 7/1977 | Taguchi | 51/295 |
| 4,049,396 | 9/1977 | Hiles | 51/295 |
| 4,322,920 | 4/1982 | Wells | 51/167 |
| 4,504,283 | 3/1985 | Charvat | 51/298 |
| 4,588,420 | 5/1986 | Charvat | 51/298 |
| 5,046,288 | 9/1991 | Scheider et al. | 51/206 |
| 5,454,752 | 10/1995 | Sexton et al. | 451/548 |
| 5,476,416 | 12/1995 | Kodate | 451/526 -- |

FOREIGN PATENT DOCUMENTS, add the following:

| | | | |
|---|---|---|---|
| WO95/23539 | 9/1995 | PCT | A64D 1/00 |
| 689655 | 6/1930 | France | 15/188 |

UNITED STATES PATENT AND TRADEMARK OFFICE
CERTIFICATE OF CORRECTION

PATENT NO.    : 6,126,533
DATED         : October 3, 2000
INVENTOR(S)   : David E. Johnson et al.

It is certified that error appears in the above-identified patent and that said Letters Patent is hereby corrected as shown below:

Column 18,
Line 17, "book" should read -- hook --.

Column 19,
Line 33, "availabie" should read -- available --.

Signed and Sealed this

Fifth Day of February, 2002

Attest:

JAMES E. ROGAN
Attesting Officer    Director of the United States Patent and Trademark Office